United States Patent
Bieterman et al.

(10) Patent No.: US 6,591,158 B1
(45) Date of Patent: Jul. 8, 2003

(54) METHODS AND APPARATUS FOR DEFINING A LOW-CURVATURE TOOL PATH

(75) Inventors: Michael Brady Bieterman, Woodinville, WA (US); Donald R. Sandstrom, Mercer Island, WA (US)

(73) Assignee: The Boeing Company, Seattle, WA (US)

( * ) Notice: Subject to any disclaimer, the term of this patent is extended or adjusted under 35 U.S.C. 154(b) by 480 days.

(21) Appl. No.: 09/591,459

(22) Filed: Jun. 9, 2000

(51) Int. Cl.[7] .............................................. G06F 19/00
(52) U.S. Cl. ...................................... 700/187; 700/169
(58) Field of Search ............................ 700/169, 4, 173, 700/182, 186, 187, 162, 160; 409/132

(56) References Cited

U.S. PATENT DOCUMENTS

| | | | | |
|---|---|---|---|---|
| 4,618,924 A | | 10/1986 | Hinds ........................... | 700/86 |
| 4,949,270 A | | 8/1990 | Shima et al. .................. | 700/86 |
| 4,953,094 A | | 8/1990 | Letcher, Jr. .................. | 700/184 |
| 4,972,334 A | | 11/1990 | Yamabe et al. ............... | 700/86 |
| 5,223,777 A | | 6/1993 | Werner et al. ............... | 700/185 |
| 5,293,321 A | | 3/1994 | Fujita et al. ................. | 700/184 |
| 5,351,196 A | | 9/1994 | Sowar et al. .................. | 29/885 |
| 5,363,309 A | * | 11/1994 | Tong Loh ................... | 700/192 |
| 5,387,852 A | | 2/1995 | Maida et al. ................ | 318/567 |
| 5,450,568 A | | 9/1995 | Saji et al. .................... | 340/542 |
| 5,595,463 A | * | 1/1997 | Takegahara et al. ........ | 409/132 |
| 5,774,359 A | | 6/1998 | Taneja .......................... | 700/86 |
| 5,872,714 A | | 2/1999 | Shaikh et al. ................. | 70/98 |
| 6,363,298 B1 | * | 3/2002 | Shin et al. .................. | 700/160 |
| 6,428,252 B1 | * | 8/2002 | Oldani ....................... | 409/132 |
| 6,438,445 B1 | * | 8/2002 | Yoshida et al. ............. | 700/173 |

* cited by examiner

*Primary Examiner*—Leo Picard
*Assistant Examiner*—Kidest Bahta
(74) *Attorney, Agent, or Firm*—Alston & Bird LLP

(57) ABSTRACT

A spiral tool path is formed by determining a plurality of relatively low-curvature nested contours that are internal to the boundary of the pocket to be formed, and spiraling between the contours. The spiral tool path includes an orbit that extends from proximate a first one of the contours that extends around a center of the pocket to be formed to proximate a second one of the contours that also extends around the center. The orbit is arranged so that as a ray originating from proximate the center pivots about the center to travel in a first direction along the entire orbit, for a section of the ray extending between the first and second contours, the percentage of the section that extends between the orbit and the first contour continually decreases and the percentage of the section that extend between the orbit and the second contour continually increases.

22 Claims, 32 Drawing Sheets

METHODS AND APPARATUS FOR DEFINING A LOW-CURVATURE TOOL PATH

FIELD OF THE INVENTION

The present invention pertains to computer numerical controlled (CNC) manufacturing machines and, more particularly, to tool paths along which CNC manufacturing machines move cutting tools to remove material.

BACKGROUND OF THE INVENTION

Pocket machining is used widely in the aerospace and other industries to mill metal parts. In pocket machining, a pocket is excavated by removing layer(s) of material. As an example, FIG. 1 illustrates a spindle 40 of a CNC manufacturing machine that is carrying a milling tool 42 and is being operated to form a pocket 44 in a layer of material 46. The spindle 40 is rotated about its elongate axis so that the milling tool 42 is rotated, and the spindle is driven along a tool path that is coplanar with the layer of material 46 so that the milling tool engages and cuts into the material (i.e., moves radially into the material). Stated differently, the material 46 is fed into the milling tool 42 due to movement of the spindle 40 along the tool path. Alternatively, the spindle axis may be stationary and the material moved relative to it.

Conventional tool paths can require high axis drive accelerations of the spindle 40 in order to keep feed rates high. This is because conventional tool paths typically include abrupt changes in direction and/or segments that have high local curvature. For example, FIG. 2 schematically illustrates a conventional zig-zag tool path 48a that has been used to remove material, such as to form a rectangular pocket 50a. FIG. 3 schematically illustrates a conventional unidirectional patterned tool path 48b that has been used to remove material, such as to form a rectangular pocket 50b. For the tool path 48b, after each horizontal pass from left to right, the milling tool 42 (FIG. 1) is lifted, moved to the left, and lowered so that it can travel along a different horizontal portion of the tool path 48b. Conventional tool paths 48c, 48d that have been used to remove material, such as to form rectangular pockets 50c, 50d, are schematically illustrated in FIGS. 4 and 5. In contrast to the tool path 48d, for the tool path 48c the milling tool 42 is picked up and moved after traveling along each rectangular portion of the tool path.

Prior tool paths, such as tool paths 48a–d, require high axis drive accelerations in order to have high feed rates, and it is common for the accelerations that are required to exceed the capability of the manufacturing machine and thereby result in lower than optimal feed rates, which is disadvantageous. In addition, prior tool paths that require high accelerations cause greater wear on milling tools 42 than do tool paths requiring lower accelerations, which is disadvantageous.

SUMMARY OF THE INVENTION

The present invention solves the above and other problems by providing methods, apparatus and computer readable medium that define and utilize tool paths that have low curvature as compared to conventional tool paths. In accordance with one aspect of the present invention, a spiral tool path is formed by determining a plurality of nested contours that are internal to the boundary of the pocket to be formed, and moving, or most preferably spiraling, between the contours. Whereas several embodiments of the present invention and several aspects of the present invention are described in the context of forming pockets, the invention is not limited to the formation of pockets. For example, the techniques of the present invention can also be used to remove material from raised or other regions, so that pockets are not formed.

In accordance with another aspect of the present invention, the nested contours are determined from a mathematical function. More specifically and in accordance with one example, an offset boundary that the outer boundary extends around is determined, and the mathematical function at least approximates a solution of an elliptic partial differential equation boundary value problem defined on the region enclosed by the offset boundary. In accordance with one embodiment of the present invention, the boundary value problem is a positive definite elliptic partial differential equation eigenvalue problem and the determined mathematical function at least approximates the principal eigenfunction for the positive definite elliptic partial differential equation eigenvalue problem.

In accordance with another aspect of the present invention, the innermost contours are each smooth, with each having low maximum curvature. This measure of curvature generally increases for each subsequent contour closer to the outer boundary.

In accordance with another aspect of the present invention, the spiral tool path includes an orbit that extends around the center of the area bounded by the pocket boundary. The orbit extends from proximate a first one of the contours that extends around the center to proximate a second one of the contours that also extends around the center. The orbit is arranged so that as a ray originating from proximate the center pivots about the center to travel in a first direction along the entire orbit, for a section of the ray extending between the first and second contours, the percentage of the section that extends between the orbit and the first contour continually decreases and the percentage of the section that extends between the orbit and the second contour continually increases.

In accordance with another aspect of the present invention, the orbit is arranged so that while travelling along the entire orbit in a constant direction, the distance from the center either continually increases or continually decreases, but does not alternately increase and decrease.

The present invention advantageously provides low-curvature tool paths, such as spiral tool paths, that allow for the implementation of high feed rates with low acceleration, as compared to conventional designs. In addition, cutting tools that travel along the tool paths defined by the method, apparatus and computer readable medium of the present invention can have relatively low wear rates, as compared to conventional designs.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 6:
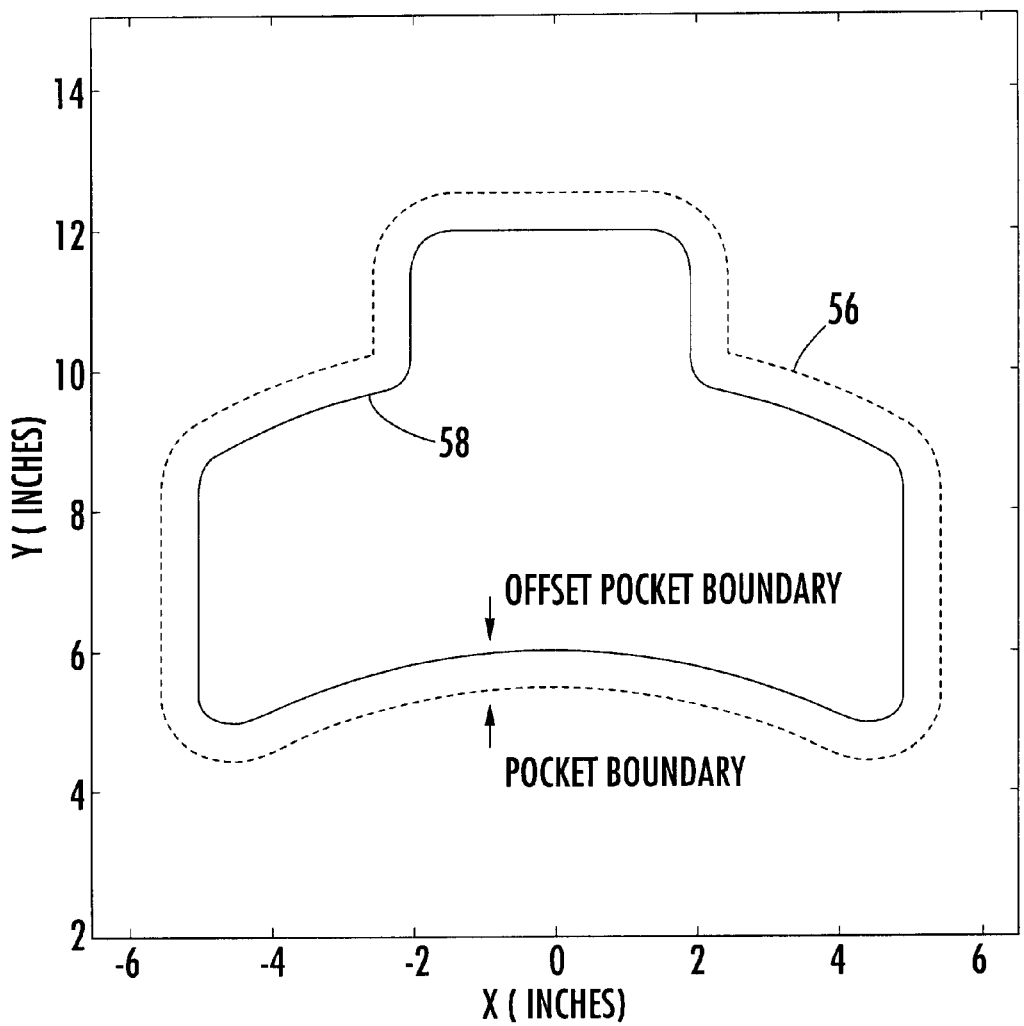
FIG. 6 illustrates a pocket boundary and an offset pocket boundary of a pocket, in accordance with a first embodiment of the present invention.
Figure 7:
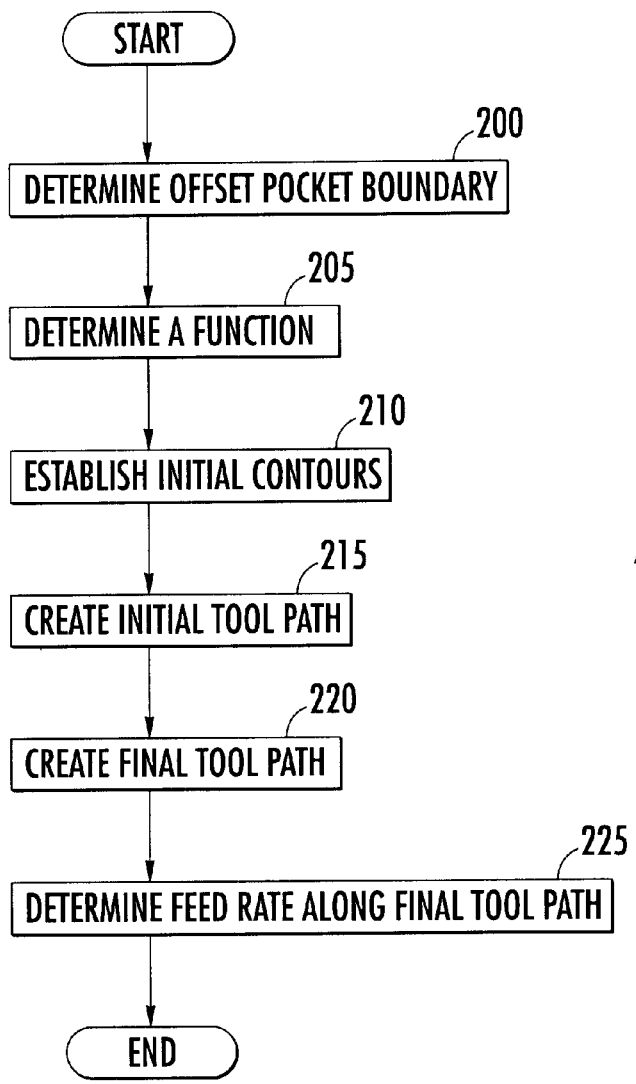
FIG. 7 presents a flow chart illustrating high level operations performed to define a generally spiral tool path, and a variable feed rate therefor, in accordance with the first embodiment.

In accordance with a first embodiment of the present invention, a cutting tool (for example see the milling tool 42 of FIG. 1) is carried by a spindle (for example see the spindle 40 of FIG. 1) of a CNC manufacturing machine 52 (FIG. 32), and the manufacturing machine operates so that the center of the cutting tool travels along a generally spiral, final tool path 54 (FIG. 13) at an optimal feed rate to form a pocket. FIG. 6 illustrates with broken lines the boundary 56 of the pocket that is formed in accordance with the first embodiment. FIG. 7 presents a flow chart illustrating high level operations performed to define the final tool path 54, and the feed rate therefor, for forming the pocket having the pocket boundary 56, in accordance with the first embodiment. Operations associated with FIG. 7 are described below, in accordance with the first embodiment.

At step 200 of FIG. 7, an offset pocket boundary 58 (FIG. 6) is determined for the pocket boundary 56 (FIG. 6). The offset pocket boundary 58 is equal to the pocket boundary 56, offset inwards by the radius of the cutting tool used to form the pocket. In accordance with the first embodiment, the cutting tool has a diameter of 1.0 inch. Accordingly, FIG. 6 illustrates that the offset pocket boundary 58 is 0.5 inches inward of the pocket boundary 56. In accordance with the first embodiment, each of the rounded corners of the offset pocket boundary 58 has a radius of 0.5 inches, which only coincidentally equals the cutting tool radius. The region interior to the offset pocket boundary 58 can be characterized as the offset pocket.

At step 205 of FIG. 7, a mathematical function is determined that is capable of providing a series of nested, closed curves that smoothly transition from an outermost closed curve that is substantially identical to the offset pocket boundary 58 (FIG. 6) to an innermost closed curve that is rounder than the outermost closed curve and located proximate the center of the offset pocket. The closed curves are taken to be constant-value contours of a scalar function defined on, and representative of the shape of, the offset pocket. That is, the function is defined on the region enclosed by the offset pocket boundary 58. The function is the solution of an elliptical partial differential equation boundary value problem subject to Dirichlet boundary conditions on the region. More specifically, the function is the fundamental mode shape, or eigenfunction, of a partial differential equation (PDE) boundary value problem involving the Laplace differential operator. The solution of the PDE is a function that vanishes on the offset pocket boundary 58 and has a unique maximum value of one at the center of the offset pocket.

The full PDE eigenvalue problem for an offset pocket $\Omega$ with boundary $\partial\Omega$ (e.g., offset pocket boundary 58) is to find a sequence of positive real numbers (eigenvalues) $\{\lambda_j\}_{j=1}, \ldots \infty$ and corresponding real eigenfunctions $\{\phi_{(j)}\}_{j=1}, \ldots \infty$, with each pair $\{\lambda, \phi\}$ satisfying $$-\nabla^2\phi(x,y)=\lambda\phi(x,y); (x,y)\epsilon\Omega, \quad (1)$$

$$\phi(x,y)=0, (x,y)\epsilon\partial\Omega; \quad (2)$$

with $\phi$ normalized, here by $$\max_{(x,y)\epsilon\Omega} \phi(x, y) = 1. \quad (3)$$

The eigenvalues are positive ($0<\lambda_1\leq\lambda_2\leq\lambda_3 \ldots \infty$), and the fundamental eigenfunction $\phi=\phi_1$ corresponding to the smallest eigenvalue $\lambda_1$ is used. The pocket center ($x_c,y_c$) where $\phi=1$ usually is not known a priori. By way of example, if the offset pocket were a rectangle $$\{(x,y): |x|\leq L/2, |y|\leq BL/2\}, \quad (4)$$

where BL is the height of the rectangle and L is the length of the rectangle, the fundamental eigenfunction $\phi$ would be $$\phi(x,y)=\cos(\pi x/L)\cos(\pi y/(BL)). \quad (5)$$

Whereas an analytic expression $\phi$ is available for a rectangular offset pocket, an analytic expression for $\phi$ is not available for the offset pocket bound by the offset pocket boundary 58 (FIG. 6) and many other offset pockets. For offset pockets for which an analytic expression for $\phi$ is not available, Equations 1–3 are numerically solved to obtain an approximation of $\phi$.

An approximate eigenfunction $\phi$ can be obtained for offset pockets by using software products that are commercially available. An example of a suitable software product for this purpose is available from The Math Works, Inc. of Natick, Mass. as MATLAB Partial Differential Equation Toolbox. That software can be used to prescribe an offset pocket, to discretize the offset pocket with a mesh of triangles, and to solve Equations 1–3 numerically with a piecewise linear finite element method.

Figure 8:
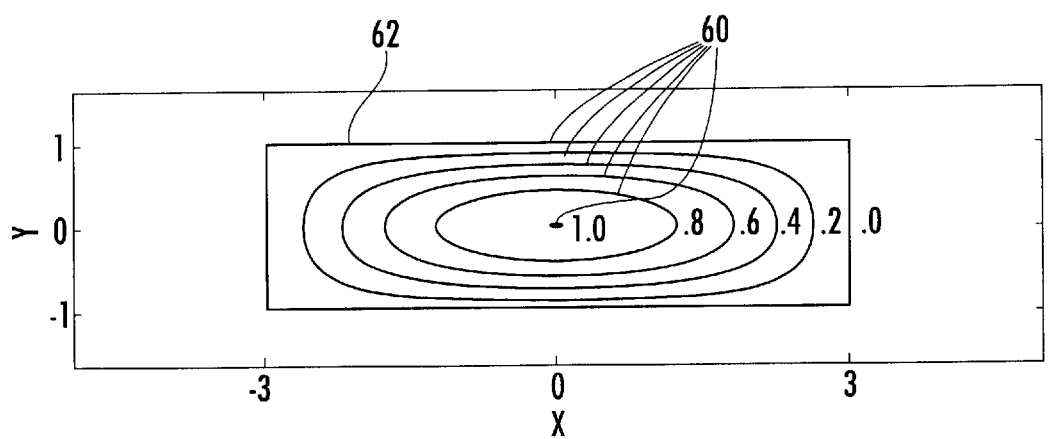
FIG. 8 illustrates initial constant value eigenfunction contours for a rectangular offset pocket, in accordance with a second embodiment of the present invention.

At step 210 of FIG. 7, a series of N initial constant value eigenfunction contours (referred to hereafter as initial contours) that are nested are established by setting the eigenfunction $\phi$ (either analytically expressed or approximate) determined at step 205 equal to a series of N different values ranging from zero to one, and for each value determining multiple points that satisfy the function. As one example, FIG. 8 illustrates a series of nested initial contours 60 established from the eigenfunction $\phi$ of Equation 5 for a rectangular offset pocket boundary 62 with an aspect ratio equal to three, in accordance with a second embodiment of the present invention. As illustrated in FIG. 8, the initial contours 60 transition from being elliptical in shape near the center of the rectangular offset pocket to being more rectangular farther from the center.

Figure 9:
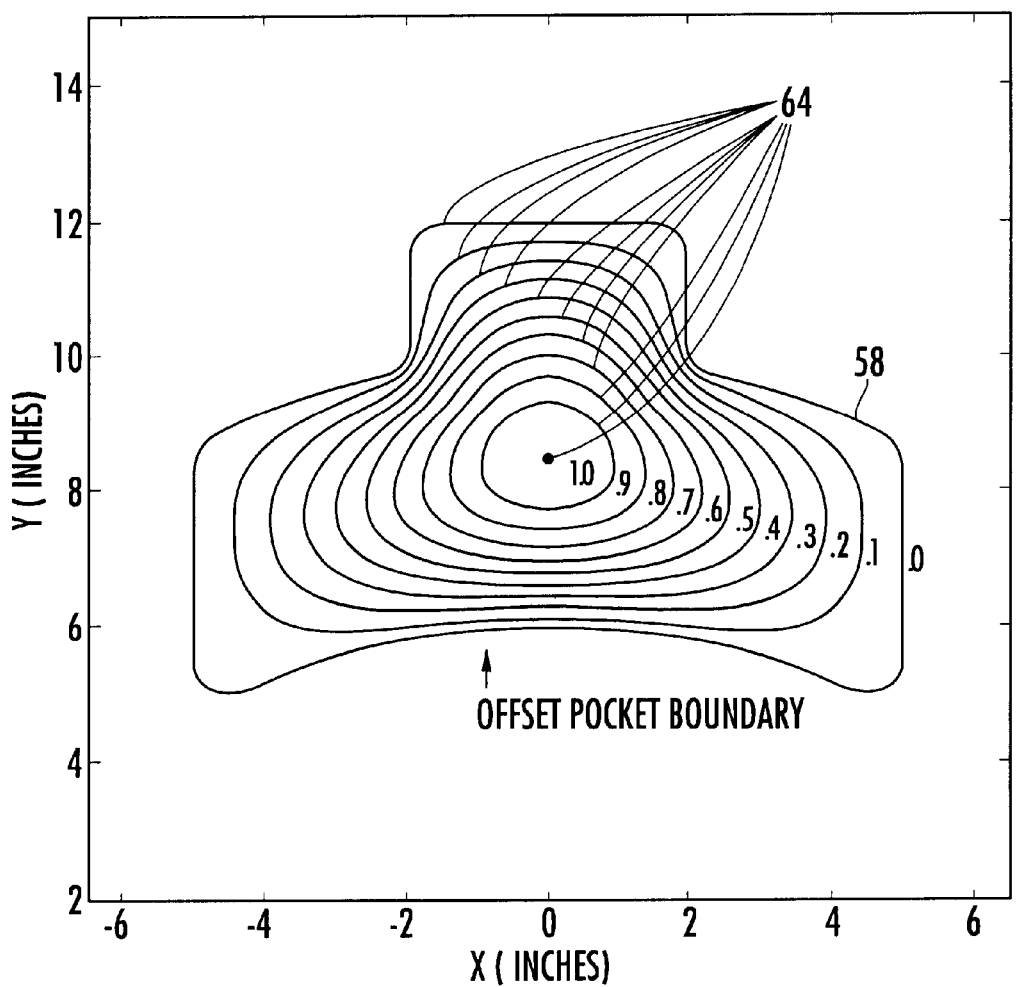
FIG. 9 illustrates initial constant value eigenfunction contours for the offset pocket of the first embodiment.

FIG. 9 illustrates a series of nested initial contours 64 for the approximate eigenfunction $\phi$ determined at step 205 for the offset pocket boundary 58, in accordance with the first embodiment. The initial contours 64 transition from low-aspect-ratio smooth three-lobed curves near the center of the offset pocket to shapes approaching that of the offset pocket boundary 58 farther from the center.

Figure 11:
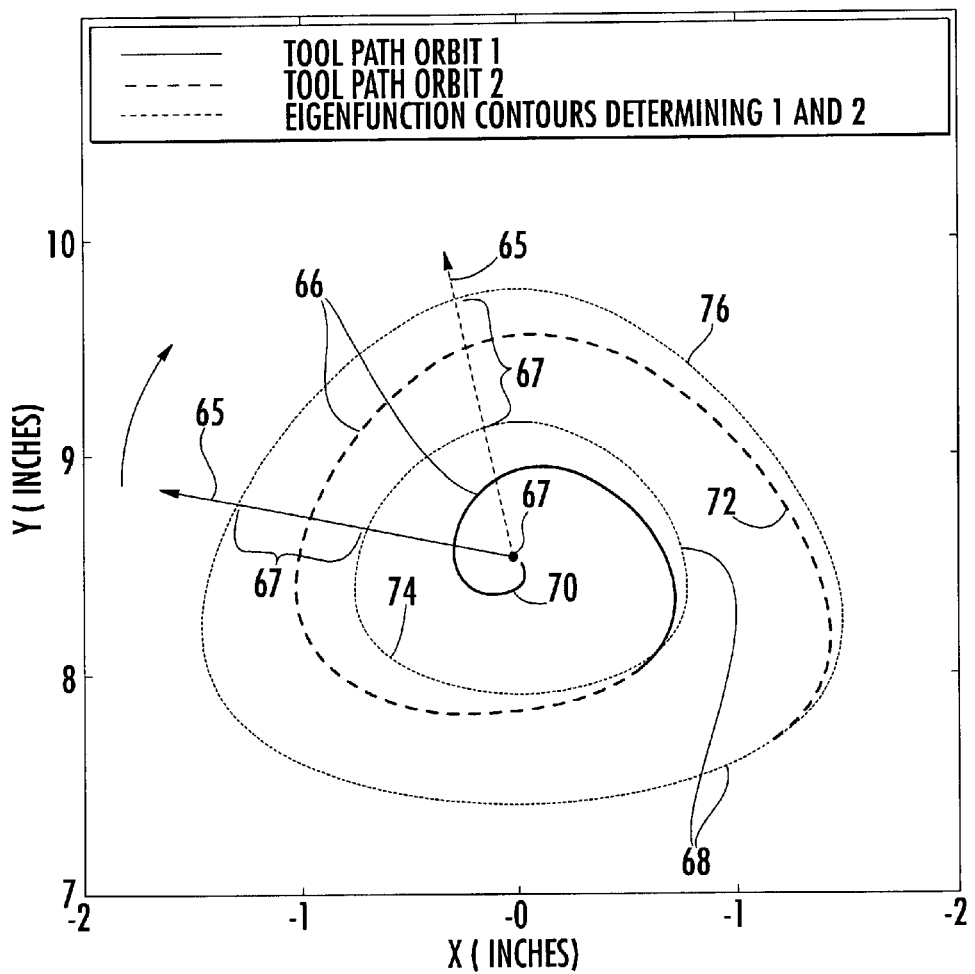
FIG. 11 illustrates, among other things, first and second orbits of the initial tool path, and a Beginning Contour and an Ending Contour for the second orbit, in accordance with the first embodiment.

In accordance with the first embodiment and briefly described, at step 215 of FIG. 7, an initial tool path 66 (FIG. 12) is created using final contours 68 (only two of which are illustrated in FIG. 11). The final contours are based upon, and in some cases identical to, respective ones of the initial contours 64 (FIG. 9) established at step 210. In accordance with the first embodiment, the initial tool path 66 is constructed orbit by orbit using the final contours 68.

The initial tool path 66 (FIG. 12) is parameterized for each point therealong by specifying an angle between the horizontal and a straight line connecting the center of the offset pocket ($x_c,y_c$) to the point along the initial tool path. Other parameterization techniques are also within the scope of the present invention. The initial tool path 66 is assembled orbit by orbit, with each orbit typically containing 180 or 360 points spaced by equal angles, which are the angles used for the parameterization. In accordance with the first embodiment, each orbit starts at some point along a fixed ray that extends from the center of the offset pocket, and each orbit consists of a 360° transversal. In accordance with the first embodiment, it is preferred for the magnitude of the directional derivative of the approximate eigenfunction $\phi$ determined at step 205 along the ray to be small (compared to that for other directions). In accordance with the first embodiment, the fixed ray is directed to the right about 35° below the horizontal. However, other arrangements of the fixed ray are within the scope of the invention, and in accordance with an alternative embodiment the orbit starting direction varies from orbit to orbit.

Figure 10:
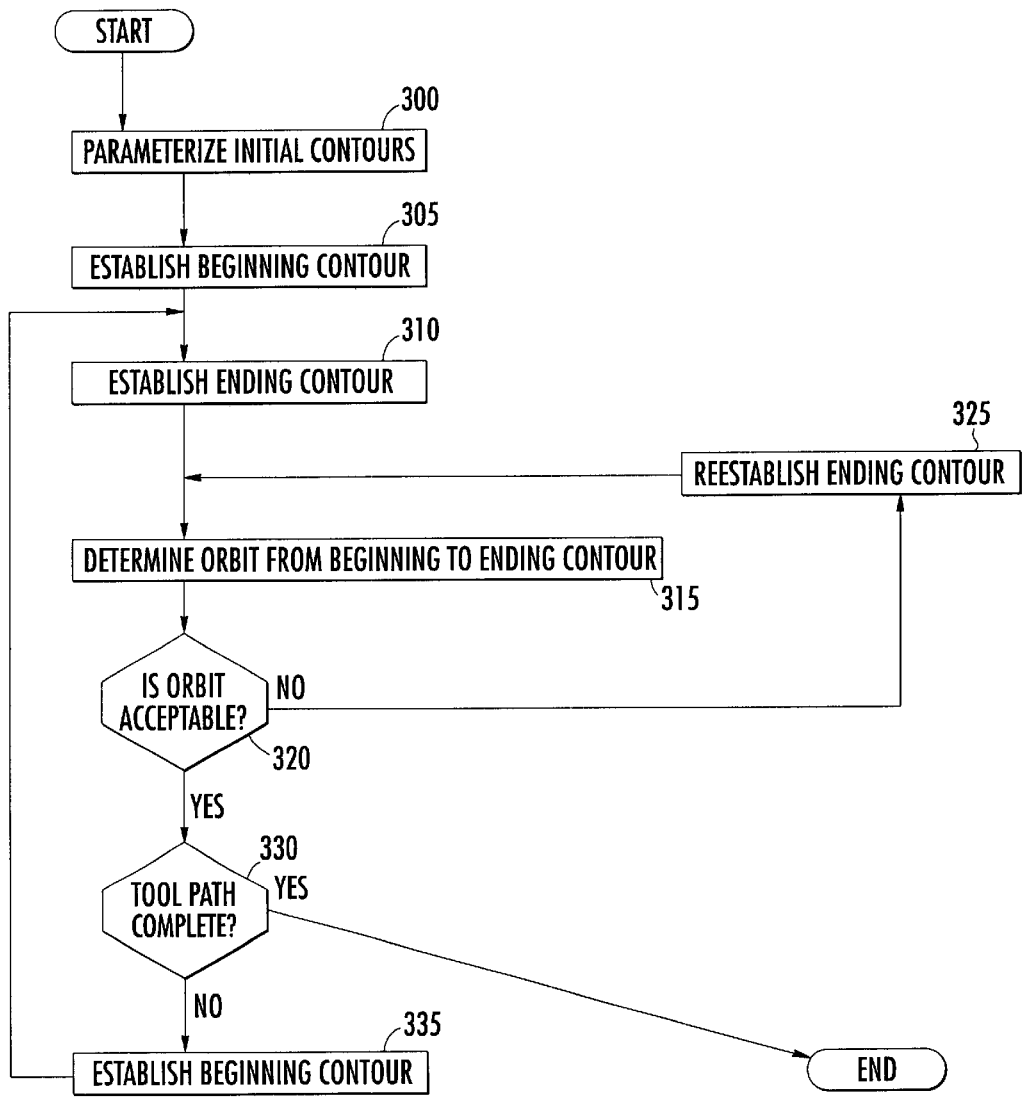
FIG. 10 presents a flow chart illustrating operations performed to create an initial tool path of the first embodiment.

FIG. 10 presents a flow chart illustrating operations performed according to step 215 of FIG. 7 to define the generally spiral, initial tool path 66 (FIG. 12), in accordance with the first embodiment. As mentioned above and in accordance with the first embodiment, the initial tool path 66 is created using the series of final contours 68 (two of which are illustrated in FIG. 11) that are derived from the initial contours 64 (FIG. 9). More specifically, at step 300 of FIG. 10, the initial contours 64 are parameterized in a manner that facilities the subsequent creation of the final contours 68. In accordance with the first embodiment, the initial contours 64 are parameterized through the use of a series of equally angularly spaced rays that extend outward from the center of the offset pocket to intersect the initial contours. From the resulting angular parameterizations, the rays can be interpolated along to construct a series of Beginning Contours and a series of Ending Contours, from which the final contours 68 are derived. In accordance with the first embodiment, the Beginning Contours and the Ending Contours approximate constant value eigenfunction contours established by setting the approximate eigenfunction $\phi$ determined at step 205 equal to a series of different values ranging from zero to one.

At step 305 of FIG. 10, a Beginning Contour is established. In accordance with the first embodiment, the Beginning Contour established at step 305 is identical to the initial contour 64 (FIG. 9) established at step 210 of FIG. 7, because that Beginning Contour is established by setting the approximate eigenfunction φ determined at step 205 equal to one. That is and in accordance with the first embodiment, the Beginning Contour established at step 305 is identical to the smallest initial contour 64 illustrated in FIG. 9. Also in accordance with the first embodiment, a constant $C_1$ that is associated with the Beginning Contour is set equal to one at step 305. In accordance with the first embodiment, the Beginning Contour established at step 305 is the innermost final contour 68. Although the innermost final contour 68 is not shown in FIG. 11, which illustrates two of the final contours, in accordance with the first embodiment the innermost final contour is identical to the innermost initial contour 64 (FIG. 9).

At step 310 of FIG. 10, an Ending Contour is established. In accordance with the first embodiment, the Ending Contour approximates a constant value eigenfunction contour established by setting the approximate eigenfunction φ determined at step 205 of FIG. 7 equal to a constant $C_2$. At step 310 the constant $C_2$ is set to be greater than or equal to zero, and less than the current value of the constant $C_1$.

Figure 12:
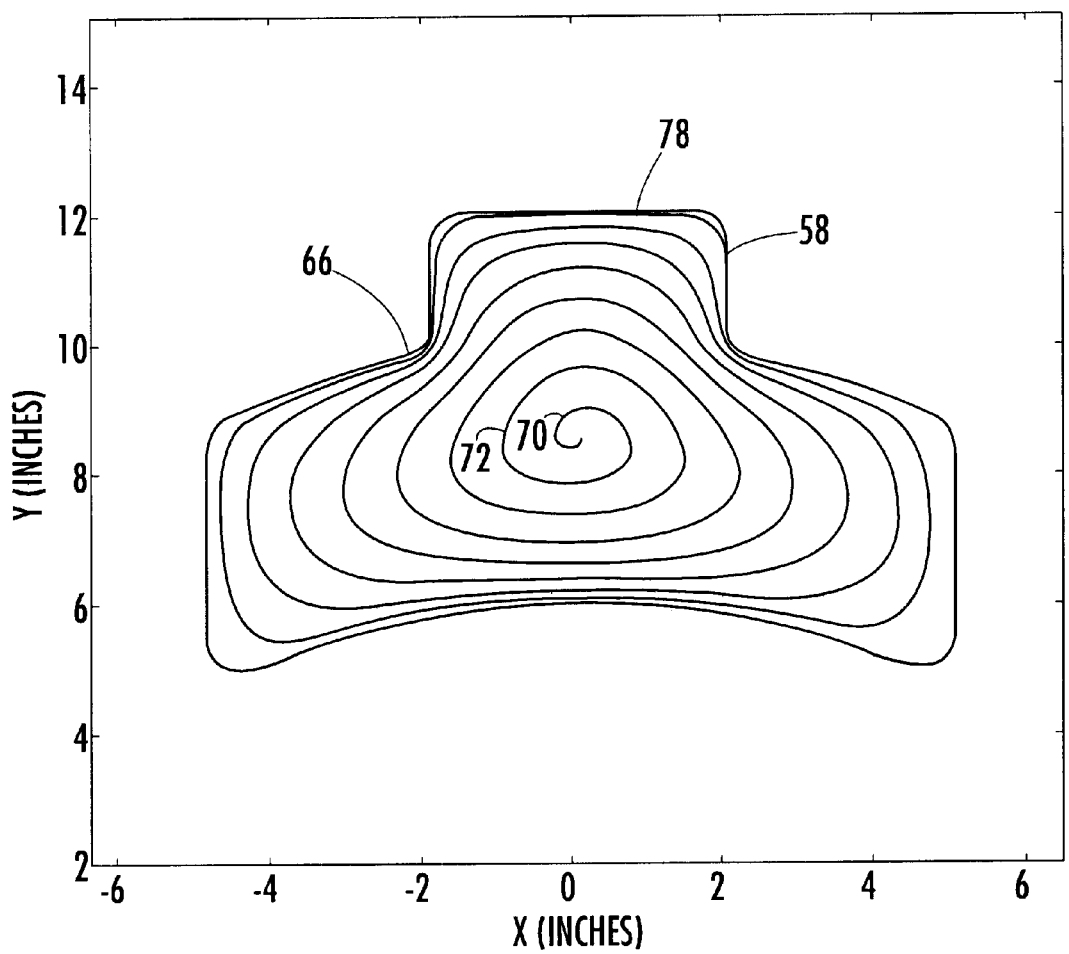
FIG. 12 illustrates the entire initial tool path of the first embodiment.

At step 315 of FIG. 10, an orbit portion of the initial tool path 66 (FIG. 12 is formed by spiraling outward from the current Beginning Contour to the current Ending Contour. More specifically, the Beginning Contour $\Gamma_1 = (\Gamma_{1x}, \Gamma_{1y}) = \{(x, y): \phi(x,y) = C_1\}$ and the Ending Contour $\Gamma_2 = (\Gamma_{2x}, \Gamma_{2y}) = \{(x, y): \phi(x,y) = C_2\}$. The orbit spirals out from the Beginning Contour $\Gamma_1$ to the Ending Contour $\Gamma_2$ so that for any angle $\theta \in (0, 2\pi)$, the center of the cutting tool (i.e., the orbit) is located at the point $(1-\theta/(2\pi))\Gamma_1(\theta) + (\theta/(2\pi))\Gamma_2(\theta)$. In the foregoing, $\Gamma_1(\theta)$ and $\Gamma_2(\theta)$ denote the (x,y) locations on the current Beginning Contour and the current Ending Contour at an angle $\theta$.

At step 320 a determination is made as to whether the orbit formed at the most recent occurrence of step 315 is satisfactory, as will be discussed in greater detail below. If a negative determination is made at step 320, control is transferred to step 325, where a new value for the constant $C_2$ is established, and in accordance with the first embodiment a new Ending Contour is established by setting the approximate eigenfunction φ determined at step 205 equal to the new value for the constant $C_2$. The value for the constant $C_2$ that is established at step 325 is selected in a manner that increases the probability of achieving a positive determination at the next occurrence of step 320, while ensuring that the value of the constant $C_2$ remains greater than or equal to zero, and less than the current value of constant $C_1$.

Figure 13:
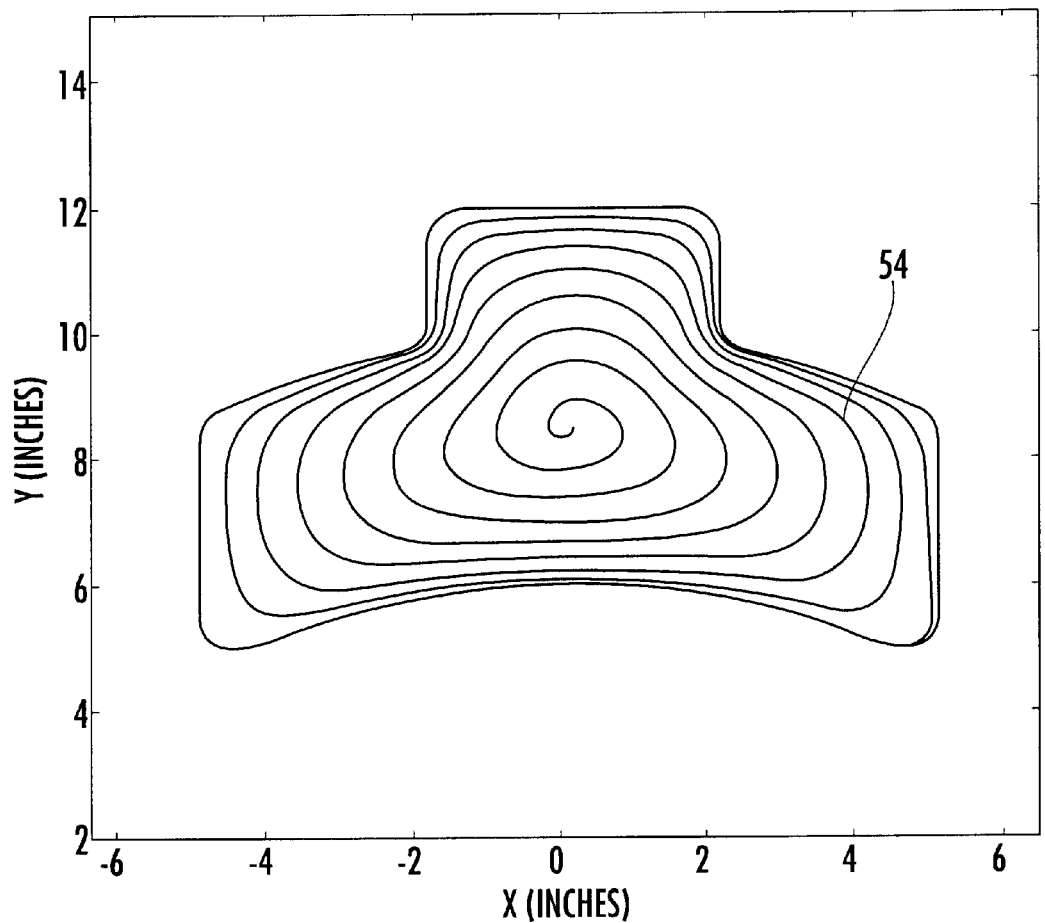
FIG. 13 illustrates an entire final tool path of the first embodiment.

Stated differently and more specifically, the combination of steps 310, 315, 320 and 325 are operative so that the value of the constant $C_2$ (i.e., the Ending Contour) is determined iteratively so that the maximum estimated radial depth of cut (rdoc) for the orbit being defined is as close as possible to a user specified desired maximum value of rdoc. In accordance with the first embodiment, the maximum value of rdoc that can be achieved with the cutting tool being used is not achievable in the final orbit(s) of the tool paths 54, 66 (FIGS. 12–13).

For each iterative value of the constant $C_2$, the estimated rdoc is approximated at each point along the orbit being defined. This approximation uses piecewise linear approximations of the boundary of the evolving uncut material, approximations of the normal directions to this curve, and ray tracing along the normals from one orbit of the curve to another. Only the maximum estimated rdoc over an orbit is compared to the desired maximum value of rdoc.

In addition, the combination of the steps 310, 315, 320 and 325 are operative so that the value of the constant $C_2$ (i.e., the Ending Contour) is determined iteratively so as to ensure that the manufacturing machine (FIG. 32) that is operating the cutting tool is capable handling the defined orbit. More specifically, in addition to determining the estimated rdoc at every point along the current orbit, the area removed per incremental path length (AoL) is also estimated at every point along the current orbit. AoL is used in enforcing a horsepower-related feed rate constraint. With constant machining efficiency E equal to the volume removal rate (in³/min) per horsepower (hp) expended, the volume removal rate can be expressed as the product of the axial depth of the cut formed by the cutting tool (adoc), AoL, and feed rate (speed) f (ipm), to obtain the constraint $$f \leq F, \tag{6}$$

where with the maximum machine spindle horsepower HP, the feed rate bound for a given AoL is $$F = \left(\frac{E \cdot HP}{adoc}\right)\left(\frac{1}{AoL}\right). \tag{7}$$

In accordance with the first embodiment, AoL is used at every point along the orbits, and it is preferred for the values of AoL to be smoothed somewhat and for a spline to be fit to the constraint F before it is used.

In response to a positive determination at the step 320 of FIG. 10, the current Ending Contour becomes a corresponding one of the final contours 68 (only two of which are illustrated in FIG. 11) and control is transferred to step 330. At step 330 a determination is made as to whether the initial tool path 66 (FIG. 12) being constructed is complete. In accordance with the first embodiment, the initial tool path 66 is complete if it is determined that movement of the cutting tool along the initial tool path thus far formed would result in the complete formation of the pocket represented by the pocket boundary 56 (FIG. 6).

In response to a negative determination at step 330, control is transferred to step 335, where the operations for establishing the subsequent orbit of the initial tool path 66 (FIG. 12) are initiated. More specifically, at step 335, the Beginning Contour is set equal to the most recently established Ending Contour. That is, the value of the constant $C_1$ is set equal to the most recent value of the constant $C_2$. Control is transferred from step 335 to step 310, and steps 315, 320 and 325 are performed in the loop-like/iterative fashion described above to construct the subsequent orbit of the initial tool path 66. For example, FIG. 11 illustrates the first and second orbits 70, 72 of the initial tool path 66, and the Beginning Contour 74 ($C_1$ is 0.921) and the final Ending Contour 76 ($C_2$ is 0.785) for the second orbit, in accordance with the first embodiment. The Contours 74, 76 are also referred to as final Contours 68.

Figure 1:
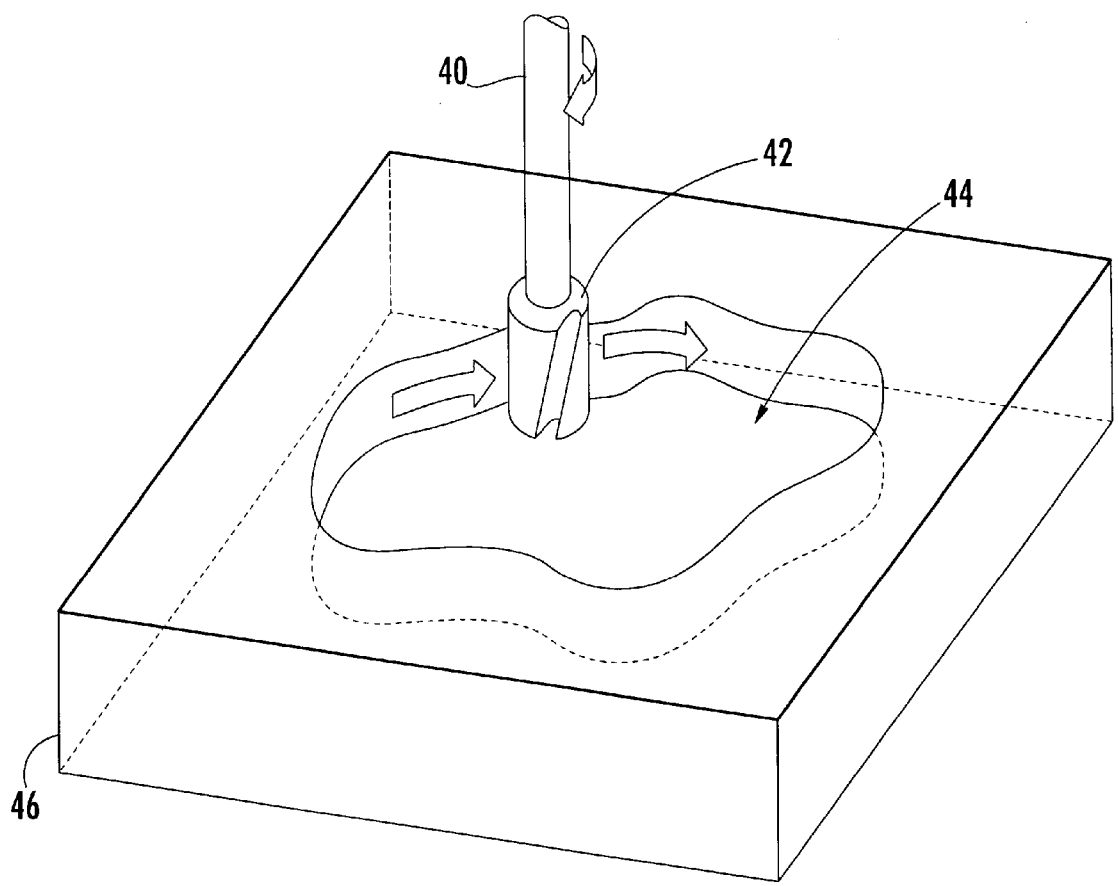
FIG. 1 illustrates a spindle of a CNC manufacturing machine that is carrying a milling tool and is being operated to form a pocket in a layer of material.
Figure 2:
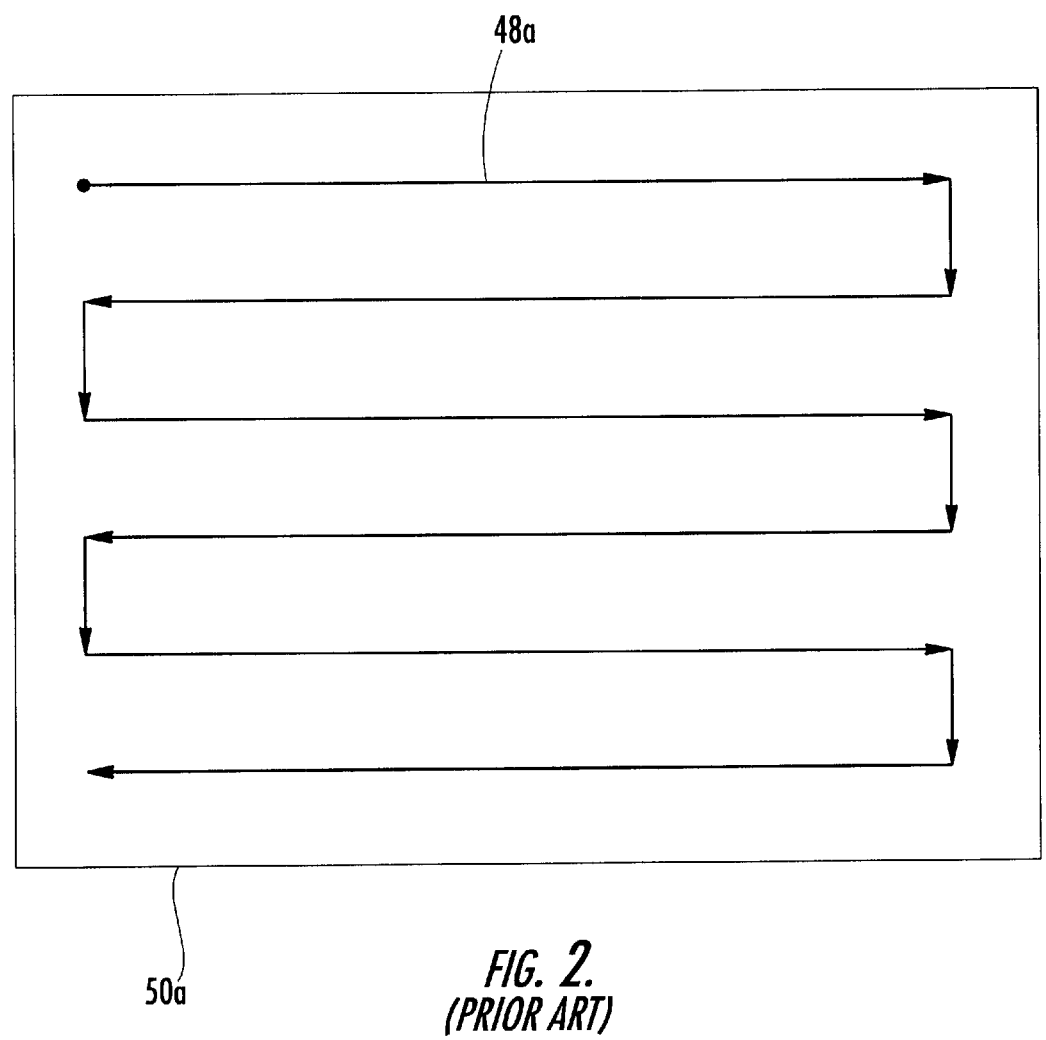
FIG. 2 schematically illustrates a conventional zig-zag tool path that has been used in the removal of material to form pockets.
Figure 3:
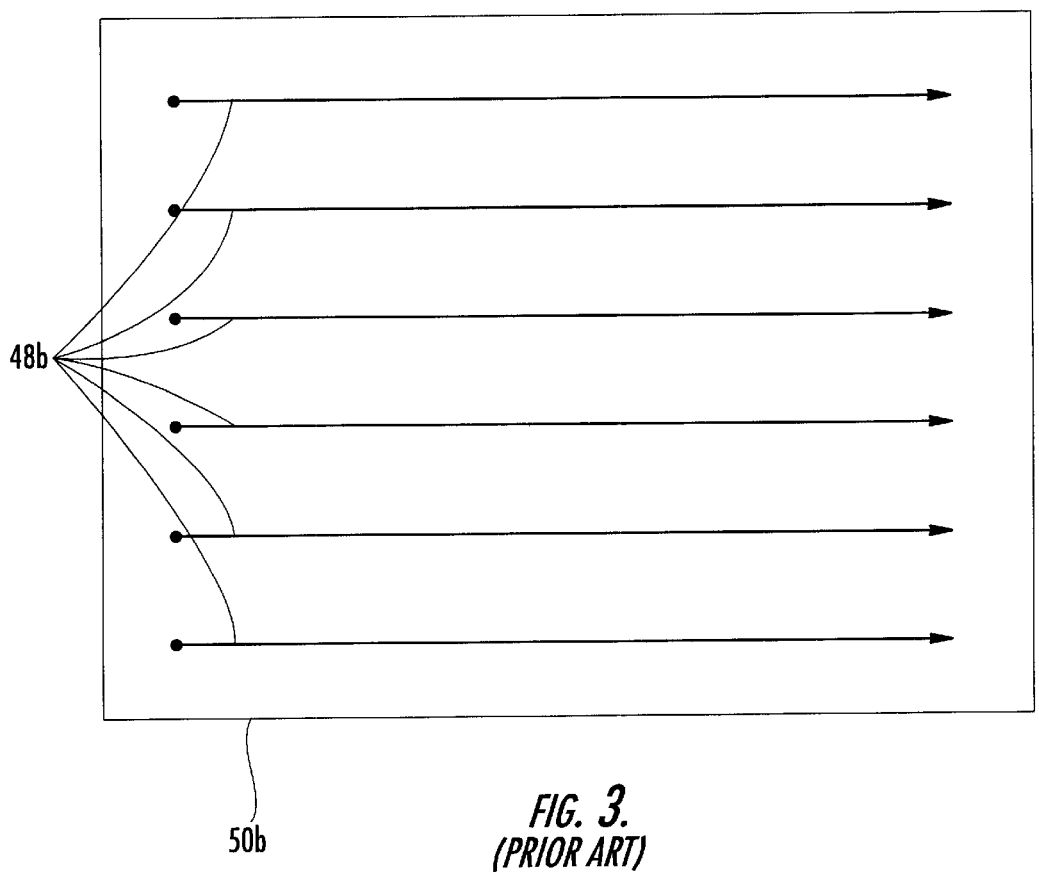
FIG. 3 schematically illustrates a conventional unidirectional patterned tool path that has been used in the removal of material to form pockets.
Figure 4:
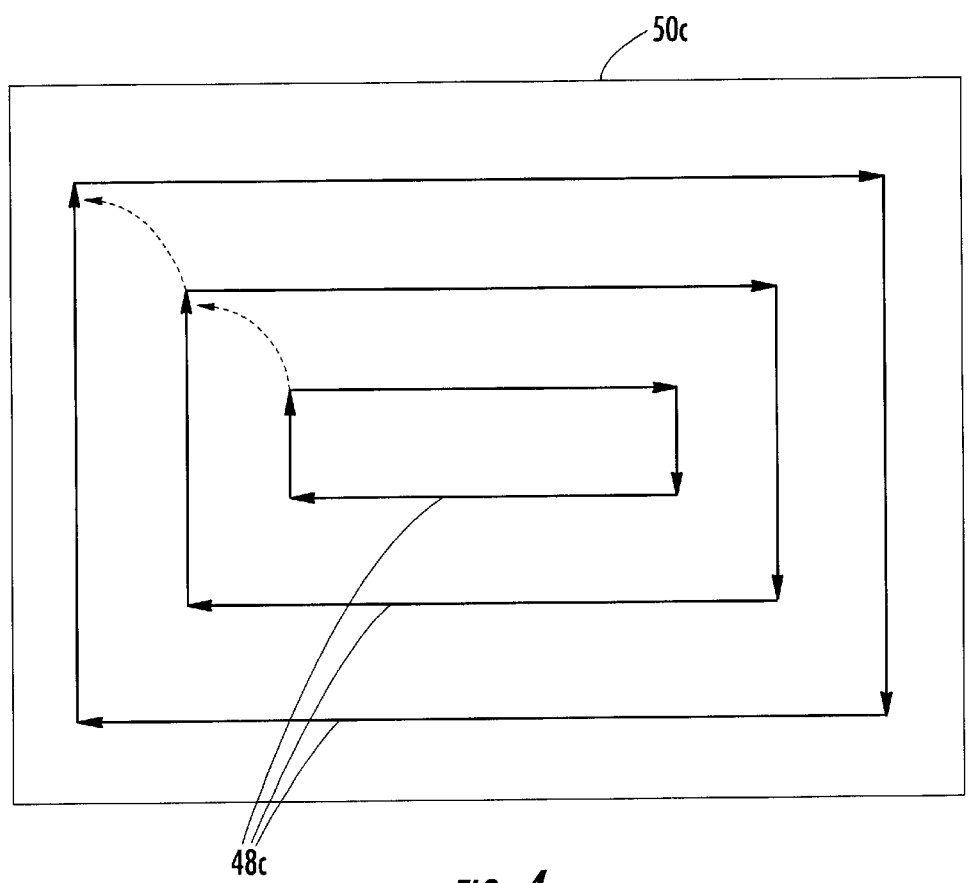
FIG. 4 schematically illustrates another conventional tool path that has been used in the removal of material to form pockets.
Figure 5:
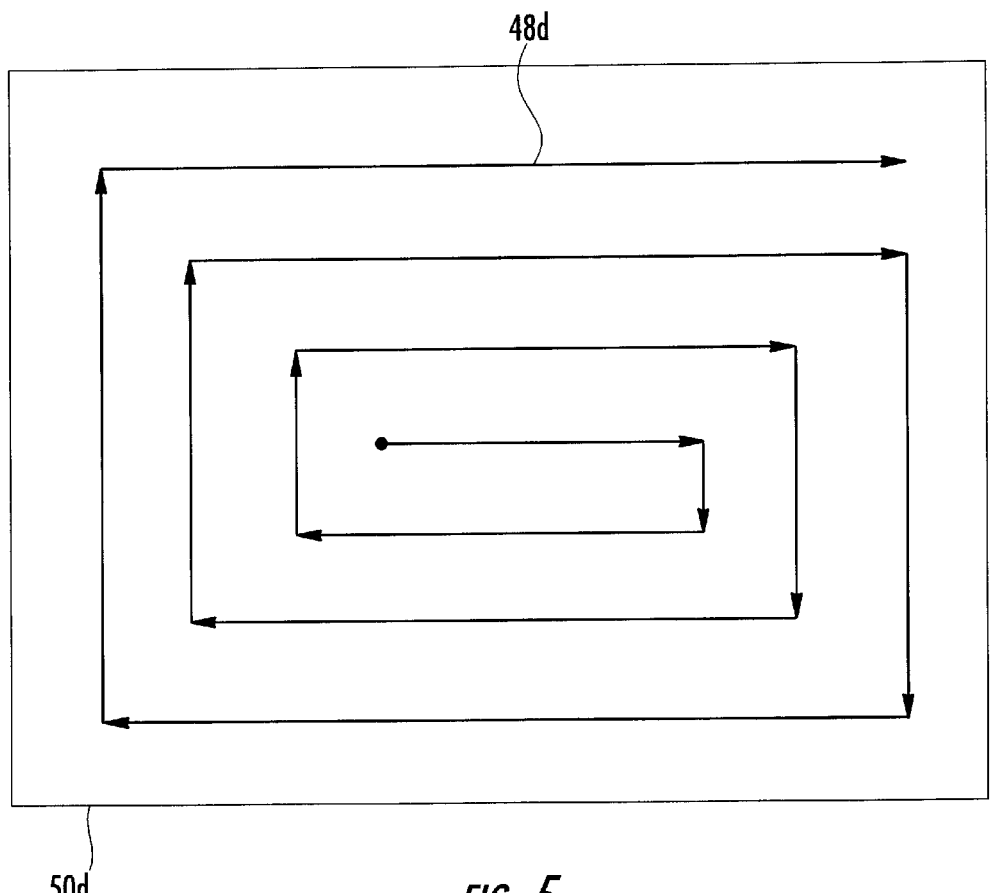
FIG. 5 schematically illustrates another conventional tool path that has been used in the removal of material to form pockets.

Referring to FIG. 11, in accordance with the first embodiment, at least each of the first and second orbits 70, 72 of the initial tool path 66 are constructed so that traveling therealong from the respective Beginning Contour to the respective Ending Contour, the closest distance to the Beginning Contour continually increases and the closest distance to the Ending Contour continually decreases. Additionally in accordance with the first embodiment, at least one and preferably multiple of the orbits of the initial tool path 66 extend around the centroid of the area bounded by the pocket boundary 56 (FIG. 6) so that while traveling along the orbit(s) in one direction the distance from the centroid continually either increases or decreases, but does not alternately increase and decrease. Referring to FIG. 1, in accordance with the first embodiment, each of the orbits of the initial tool path 66 are constructed so that as an imaginary ray 65 originating from proximate the centroid 67 of the offset pocket pivots clockwise about the centroid the ray travels along the orbits. For the entirety of each orbit of the initial tool path 66, the ray 65 travels along the orbit so that for the section of the ray extending between the respective Beginning and Ending Contours, the percentage of the section that extends between the orbit and the Ending Contour continually decreases, and the percentage of the section that extends between the orbit and the Beginning Contour continually increases, while the ray pivots clockwise. For example, the ray 65 is illustrated by a solid line in a first position and the ray 65 is illustrated by broken lines in a second position in FIG. 11, and the ray includes a section 67 that extends between the Beginning Contour 74 and the Ending Contour 76. As the ray 65 pivots clockwise between the first and second positions illustrated in FIG. 11, the percentage of the section 67 that extends between the second orbit 72 and the Ending Contour 76 continually decreases, and the percentage of the section 67 that extends between the second orbit 72 and the Beginning Contour 74 continually increases.

The forming of the initial tool path 66 (FIG. 12) is complete when a positive determination is made at step 330 of FIG. 10. In accordance with the first embodiment, the entire final orbit (i.e., the ninth orbit 78 illustrated in FIG. 12) of the initial tool path 66 is identical to the offset pocket boundary 58. More generally, in accordance with the first embodiment, distinct parts of the offset pocket boundary 58 are included in the last and next-to-last orbits of the initial tool path 66.

As illustrated in FIG. 12, a bunching of the most outer orbits of the initial tool path 66 results in very small rdoc in portions of the outer most orbits. In accordance with the first embodiment, some of the bunching occurs because the final orbit's maximum rdoc is much less than the desired maximum value of the rdoc. This is caused, in accordance with the first embodiment, because once an orbit is created, it is never created again. In accordance with an alternative embodiment of the present invention, the desired maximum value of the rdoc is changed iteratively and orbits are created iteratively so that all of the orbits have approximately the same maximum rdoc.

At step 220 of FIG. 7, the initial tool path 66 (FIG. 12) is at least partially smoothed to create the final tool path 54 (FIG. 13), which in accordance with the first embodiment has a length of approximately 154 inches. More specifically, at step 220 the final tool path 54 is formed by at least partially alleviating the bunching of the outer most orbits of the initial tool path 66 and smoothing the initial tool path by performing several passes of 3-point smoothing operations, both from orbit to orbit along the above-mentioned rays and successively from path point to path point. The orbit to orbit smoothing changes the maximum rdoc values for some orbits. This regularizes the final tool path 54 by increasing rdoc near the pocket boundary 56 and decreasing it elsewhere. The orbit to orbit smoothing causes interior portions of the final tool path 54 to increasingly reflect the local high curvature of the offset pocket boundary 58. The point to point smoothing helps alleviate minor curvature discontinuities in the final tool path 54 that were introduced at orbit to orbit transitions by interpolation between the contours.

Figure 14:
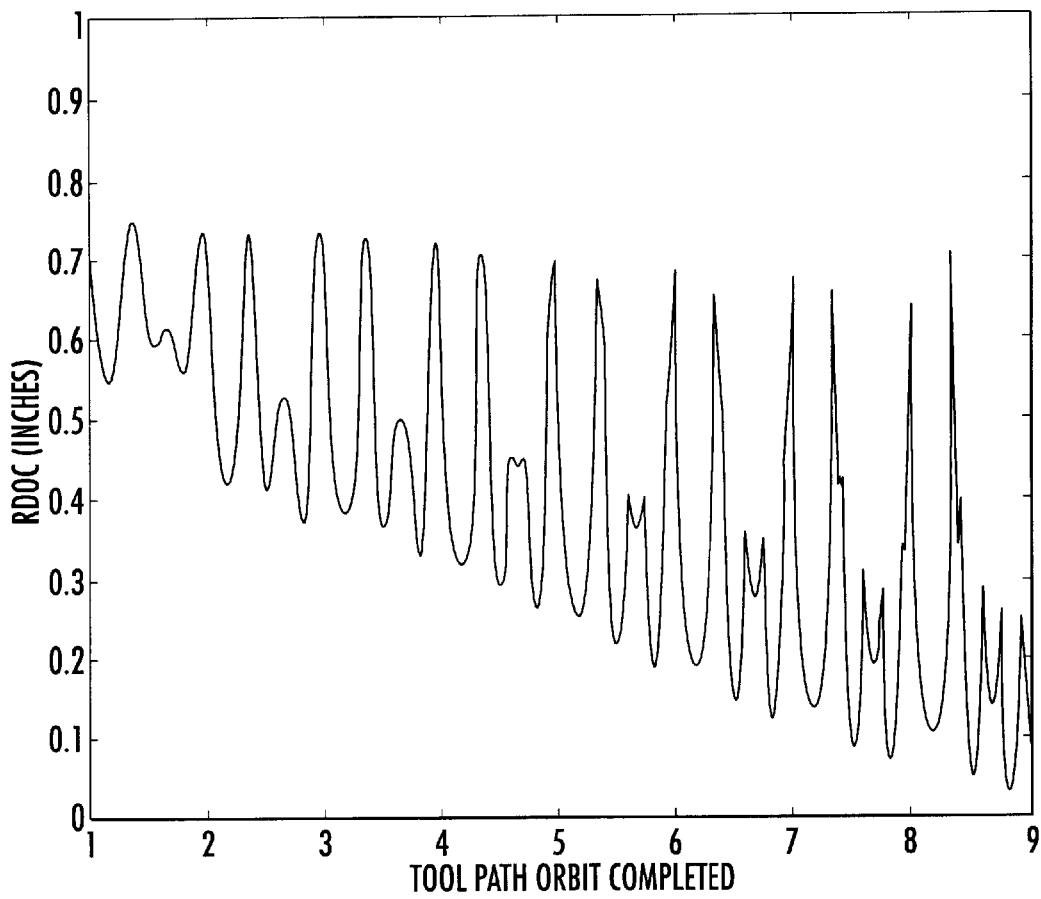
FIG. 14 illustrates the manner in which estimated radial depth of cut varies along the final tool path, in accordance with the first embodiment.
Figure 15:
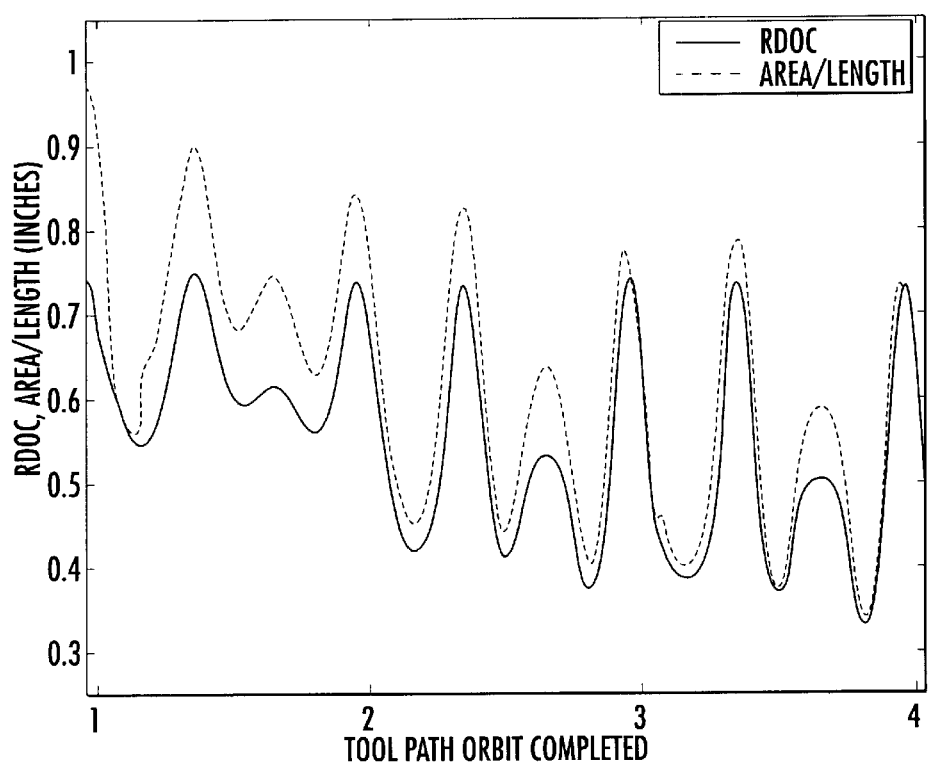
FIG. 15 illustrates area removed per incremental path length and the estimated radial depth of cut for an initial portion of the final tool path, in accordance with the first embodiment.

In view of the forgoing, exemplary values can be calculated and illustrated. In accordance with the first embodiment, the diameter of the cutting tool is 1.0 inch, the input desired maximum value of rdoc=0.75 inches, and adoc=0.10 inches. FIG. 14 illustrates how the maximum estimated rdoc varies along the final tool path 54, in accordance with the first embodiment. FIG. 15 illustrates both AoL and the maximum estimated rdoc for the first part of the final tool path 54, in accordance with the first embodiment.

In accordance with the first embodiment, operations are performed at step 225 of FIG. 7 to determine an optimal and varying feed rate along the final tool path 54, and those operations are described below. The low-curvature final tool path 54 (FIG. 13) advantageously allows for high feed rates, particularly in the central region of the offset pocket. The combination of the low-curvature final tool path 54 and the optimum and varying feed rate allow the capabilities of the manufacturing machine 52 that is driving the cutting tool to be advantageously fully utilized for substantially the entire final tool path.

Relevant to the operations performed at step 225 are the maximum axis drive velocity components (VX and VY) and the maximum axis drive acceleration components (AX and AY) for the manufacturing machine 52 that is driving the cutting tool. In accordance with the first embodiment, V=VX=VY and A=AX=AY. Operations performed to establish the feed rate are described below, in accordance with the first embodiment.

The final tool path 54 is parameterized by a twice continuously differentiable parametric spline curve that is fit to the final tool path. The arclength-like spline parameter s in the spline curve increases monotonically from a value of zero at the beginning of the final tool path 54 to one at the end of the final tool path. Letting s depend (monotonically) on time t, once the dependence of s on t is determined, the vectors of position r, velocity $\dot{r}$, and acceleration $\ddot{r}$ are defined as functions of t via $$r=\{x(s(t)),y(s(t))\}, \tag{8}$$

$$\dot{r}=r_s \dot{s}, \tag{10}$$

$$\ddot{r}=r_{ss}(\dot{s})^2+r_s \ddot{s}. \tag{10}$$

In view of the foregoing, the feed rate optimization problem is formulated as a trajectory optimization problem directed to minimizing the final time $t_f$ (possibly plus a regularization term) subject to the dynamics $$\dot{s}=v, \tag{11}$$

$$\dot{v}=(a) \tag{12}$$

$$s(0)=0,\ s(t_f)=1,\ v(0)=0,\ v(t_f)=0, \tag{13}$$

and constraints $$-V \leq r_s(v) \leq V, \tag{14}$$

$$-A \leq r_{ss}v^2+r(a) \leq A, \tag{15}$$

$$f=|r_s|v \leq F, \tag{16}$$

where F is defined in Equation 7. In the foregoing, v and a can be interpreted as arc speed and acceleration ($v \geq 0$, while a can be positive or negative). The units for v and a are $\sec^{-1}$ and $\sec^{-2}$, respectively. The boundary conditions specified in Relationships 13 for v enforce the fact that the cutting tool is at rest at the beginning and end of the final tool path 54.

General purpose trajectory optimization software may be capable of solving the foregoing optimization problem. Nonetheless, in accordance with the first embodiment, the trajectory optimization problem is reformulated by treating s, and not t, as the independent variable, changing the objective function, and changing some of the constraints. More specifically, the dynamics expressed in Equations 11–13 are replaced with the consistent equations $$(v^2)_s = 2a, \quad (17)$$

$$v(0) = v(1) = 0. \quad (18)$$

The optimization problem is to maximize v subject to Equations 17–18, the Constraints 15 on component accelerations, and $$f = |r_s| v \leq \bar{F}, \quad (19)$$

where $\bar{F}$ is defined for $s \in [0, 1]$ as the minimum of three quantities:
1. V,
2. $(AR)^{1/2}$, where $R = |r_s|^3 / |r_s \times r_{ss}|$ is the final tool path's radius of curvature, and
3. F from Equation 7 (i.e., Constraint 16).

Enforcing Quantity 1 above is slightly more restrictive than enforcing the component velocity limits. If, for example, a final tool path contained many segments oriented at a 45° angle with the x- and y-coordinate axes, the present formulation would limit the feed rate on these segments to be no more than V, while the axis drive limits themselves would permit a feed rate there as high as $\sqrt{2}V$. Enforcing Quantity 2 above is requiring the final tool path's centripetal acceleration to be less than each component limit, which is only very slightly more restrictive in most cases than the Constraints 15.

At each point of the final tool path 54, equality will hold for the solution of this optimization problem in at least one of the constraints. And, for any $s \in [0, 1]$, we can recover the time $t = t(s)$ via the relation $$t(s) = \int_0^s (1/v(\sigma)) d\sigma. \quad (20)$$

A key parameter for the optimization problem expressed by Equations 17–18 and Constraint 19 is L/D, where L is a length scale associated with the pocket or final tool path 54 and $D = V^2/(2A)$ is the distance the cutting tool travels from rest at maximum acceleration A until reaching the maximum permitted velocity V. In what follows, let $L = \int_0^1 |r_s| ds$ be the length of the final tool path 54 described by the position vector r. It is assumed in what follows that the horsepower-related feed rate Constraint 16 does not apply.

Introducing the dimensionless variable $w = v(L/A)^{1/2}$ (v has units of sect$^{-1}$), the governing constraints on w are, from the first part of Constraint 19

$$(|r_s|/L)^2 w^2 \leq 2D/L \quad (21)$$

from the second part of the Constraint 19

$$w^2 \leq (|r_s|L)/|r_s \times r_{ss}|, \quad (22)$$

and, incorporating the dynamics equation $$2a = (v^2)_s = (A/L)(w^2)_s \quad (23)$$

in the Constraints 15

$$|r_{ss} w^2 + \tfrac{1}{2} r_s (w^2)_s| \leq L. \quad (24)$$

Time t can be recovered from w via $$t(s) = (A/L)^{1/2} \int_0^s (1/w(\sigma)) d\sigma. \quad (25)$$

At every point along a tool path, equality holds in at least one of Constraints 21, 22, and 24 for the solution of the optimization problem. As apparent from these constraints, the dimensionless arc speed w as a function of s is the same on any fixed path for any combination of V and A yielding the same D. The dimensionless arc speed w as a function of s is also the same on any magnified path (i.e., $\bar{r} = \alpha r$), provided L/D stays the same. The machining times change with the factor A/L in Equation 25, but this factor is independent of the path shape. This independence allows for extrapolation of path-to-path machine time comparisons for various values of A, V, and L.

In order to numerically solve Equations 17 and 18, s, v, and a are discretized. For the final tool path 54 of the first embodiment, about 16,000 nodal points $\{s_i\}$ were used for s that were spaced by roughly equal angles. The trapezoidal method form of the governing equations is, for $i = 1, \ldots, n-1$ $$v_{i+1}^2 - v_i^2 = 2 \Delta s_i \bar{a}_i \quad (26)$$

with $$v_1 = v_n = 0, \quad (27)$$

where $v_i = v(s_i)$, $\Delta s_i = s_{i+1} - s_i$, and $\bar{a}_i$ is associated with the midpoint $(s_i + s_{i+1})/2$. After the $\{v_i\}$ are determined, the times $\{t_i\}$ at $\{s_i\}$ are recovered with the consistent formula $$\Delta s_i = \Delta t_i (v_i + v_{i+1})/2. \quad (28)$$

This discrete optimization problem can be approximately solved using a 2-pass algorithm and some smoothing. The stages in the algorithm are the following.
1. $v_i$ is set to $\bar{F}_i$ for $i = 2, \ldots, n-1$.
2. Moving from left to right (increasing i), if $\bar{a}_i$ computed in Equation 26 results in a violation of one of the acceleration component bounds expressed in Constraint 15, $\bar{a}_i$ is adjusted and $v_{i+1}$ is computed again from Equation 26 unless this new value would exceed $\bar{F}_{i+1}$. At the end of this stage each $\bar{F}_i$ is reset as $\min\{\bar{F}_i, v_i\}$.
3. Next, the same algorithm as in the Stage 2 above is applied from right to left (decreasing i), where $v_i$ and not $v_{i+1}$ is possibly adjusted for each i.
4. Lastly, nodal arc acceleration values $\{a_i\}$ are obtained by averaging and further smoothing the midpoint values $\{\bar{a}_i\}$, new midpoint accelerations are interpolated from the nodal values, and Equation 17 is used with the new midpoint values to reset $\{v_i\}$.

In view of the forgoing, exemplary values can be calculated and illustrated. In accordance with the first embodiment, the diameter of the cutting tool is 1.0 inch, the input desired maximum rdoc=0.75 inches, adoc=0.10 inches, V=VX=VY=2000 in/min (ipm), A=AX=AY=2G (G≈32.2 ft/sec$^2$), HP=50 hp, and E=3.5 in$^3$/min. Accordingly, in accordance with the first embodiment, D, which is the minimum distance traveled from rest to reach maximum velocity or feed rate, is about 1.44 in. In accordance with the first embodiment, the spindle speed is 50,000 rpm, the linear cutting speed is about 13,000 surface feet per minute, the cutting tool has three teeth that, when fed at the maximum 2000 ipm, result in a maximum chip load of about 0.013 inches.

Figure 16:
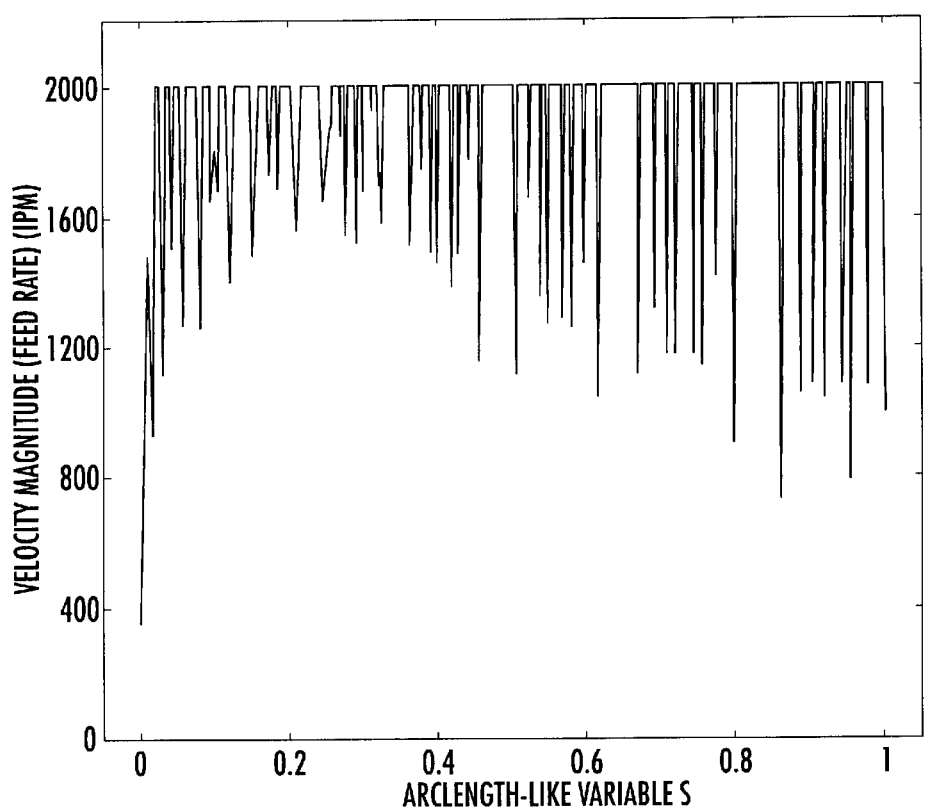
FIG. 16 illustrates a feed rate bound, in accordance with the first embodiment.

FIG. 16 illustrates the feed rate bound $\bar{F}$ of Equation 19, in accordance with the first embodiment. In accordance with the first embodiment, the cut is relatively shallow and essentially no horsepower-related term appears in the definition of $\bar{F}$. In accordance with the first embodiment, the final feed rate essentially is obtained by applying the acceleration constraints to limit the slope of $\bar{F}$ as a function of the parameter s. This is basically controlling the acceleration in the direction tangential to the final tool path 54.

Figure 17:
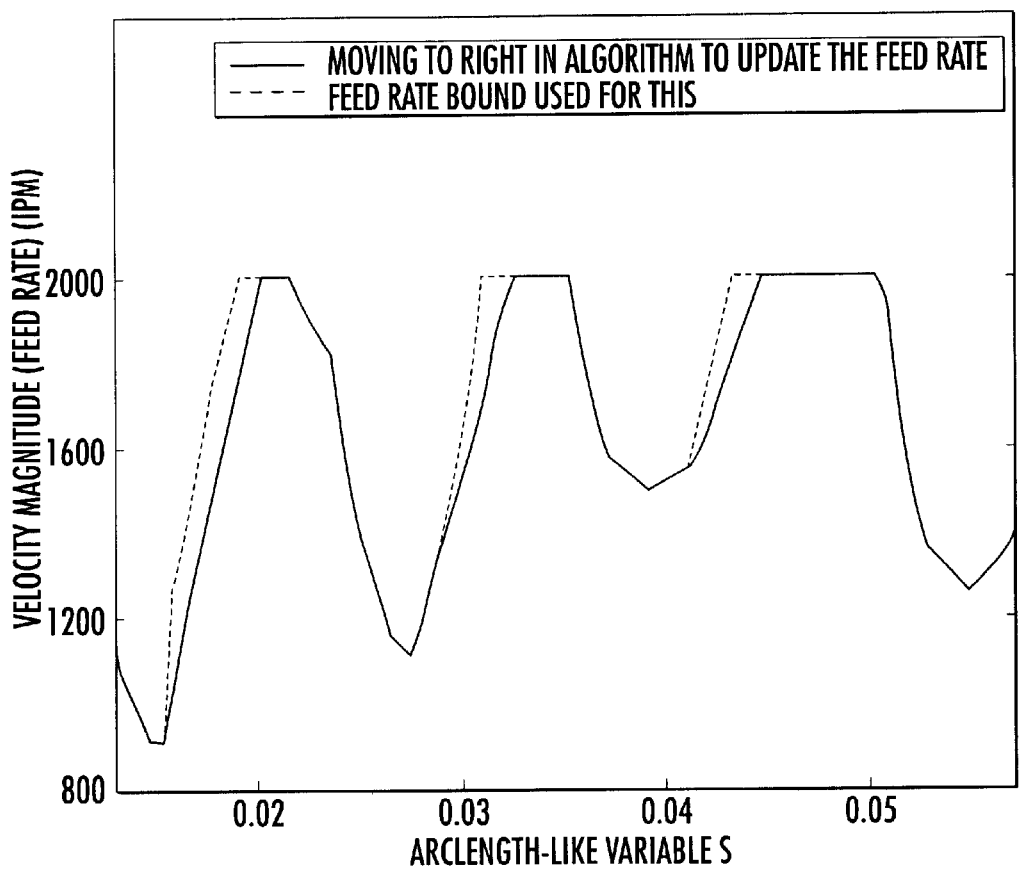
FIG. 17 illustrates the operation of a 2-pass algorithm, moving to the right, with the feed rate bound illustrated in FIG. 16, in accordance with the first embodiment.
Figure 18:
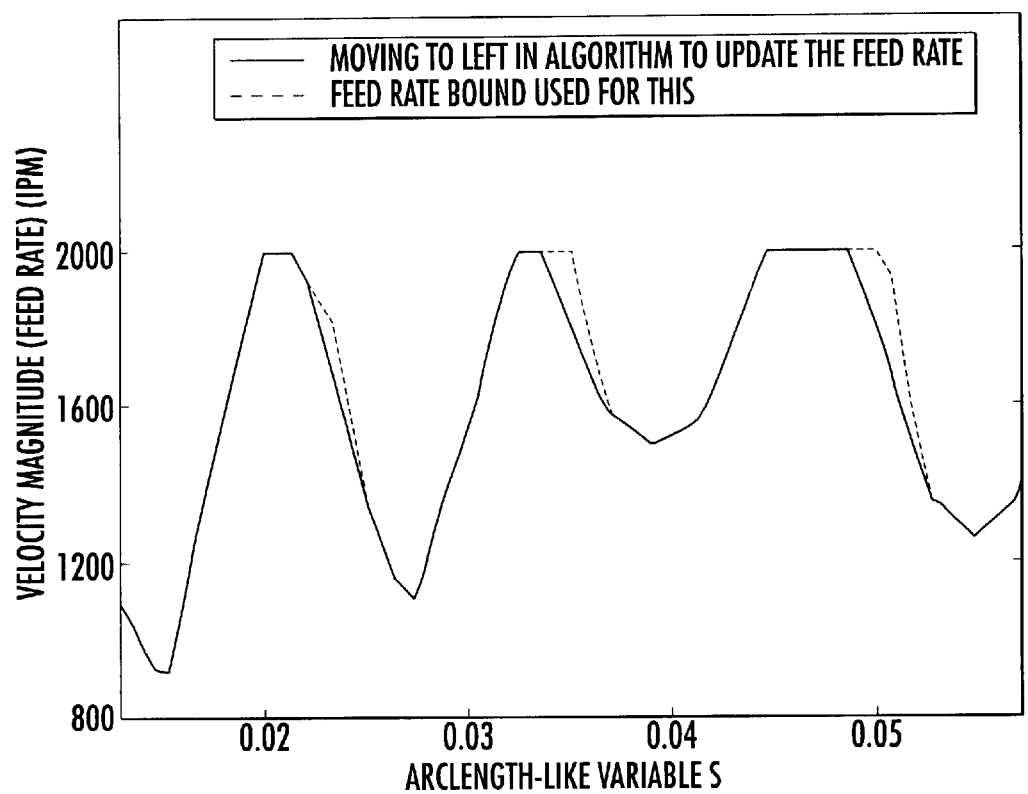
FIG. 18 illustrates the operation of the 2-pass algorithm, moving to the left, with the feed rate bound illustrated in FIG. 16, in accordance with the first embodiment.

FIGS. 17 and 18 illustrate how the 2-pass algorithm works with the feed rate bound pictured in FIG. 16, in accordance with the first embodiment. FIGS. 17 and 18 illustrate setting v for the feed rate $|r_s|v$ in the 2-pass algorithm. FIG. 17 illustrates the first pass, moving left to right. Nonvisible parts of the feed rate bound coincide with the updated feed rate in FIG. 17. In FIG. 17, the s-parameter range corresponds to the second orbit 72 of the final tool path 54. The initial feed rate bound illustrated in FIG. 17 is the same as that illustrated in FIG. 16. FIG. 18 illustrates the second pass, moving right to left. Nonvisible parts of the feed rate bound coincide with the updated feed rate in FIG. 18. In FIG. 18, the s-parameter range corresponds to the second orbit 72 of the final tool path 54. In moving from left to right (Stage 2—FIG. 17), the acceleration essentially is limited not to be too high, while the right-to-left pass (Stage 3—FIG. 18) essentially limits deceleration.

Equations 8–10 can be used to obtain approximations of all physical quantities of interest at $\{t_i\}$, $\{s_i\}$, or at any distance along the final tool path 54. In accordance with the first embodiment, in order to implement the final tool path 54, it is post-processed and provided to the computer controller 80 (FIG. 32) of the manufacturing machine 52 (FIG. 32) as a smooth parameterization in time t of the final tool path position $r=\{x(t),y(t)\}$ and velocity $\dot{r}=\{\dot{x}(t),\dot{y}(t)\}$, where the acceleration $\ddot{r}(t)$ is continuous in time t as well. This can be accomplished by curve fitting the discrete data. For example, for a rectangular pocket with slightly rounded corners a twice-continuously-differentiable-in-time-t spline representation of r can be computed by: (a) obtaining a Hermite quintic polynomial fit $s_H$ of $s_i=s_i(t)$ (using the data $\{s_i,v_i,a_i\}$), and then (b) fitting the position vector $r(S_H(t))$ of the initial spline path representation of the final tool path at a large number of uniformly-spaced times t.

Each time a spline fit is performed the final tool path 54 changes, and by not treating more directly path curvature and local trajectory effects, undesirable errors can be introduced. Accordingly, it is preferred to account for local effects, incorporate and control derivative information, and replace the discrete tool path representations in large parts of the algorithm with consistent splines. In accordance with an alternative embodiment, discrete path and feed rate data, or data in other forms, is supplied to the controller without the need for spline representation.

Figure 19:
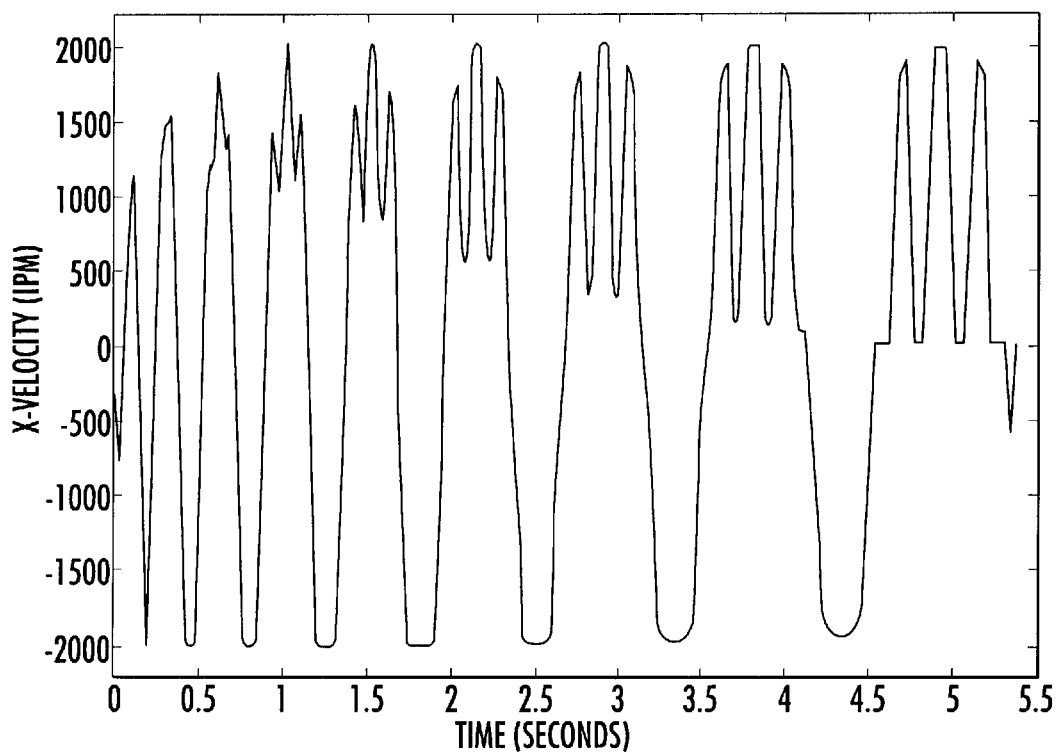
FIG. 19 illustrates x velocity components for the cutting tool moving along the final tool path, in accordance with the first embodiment.
Figure 20:
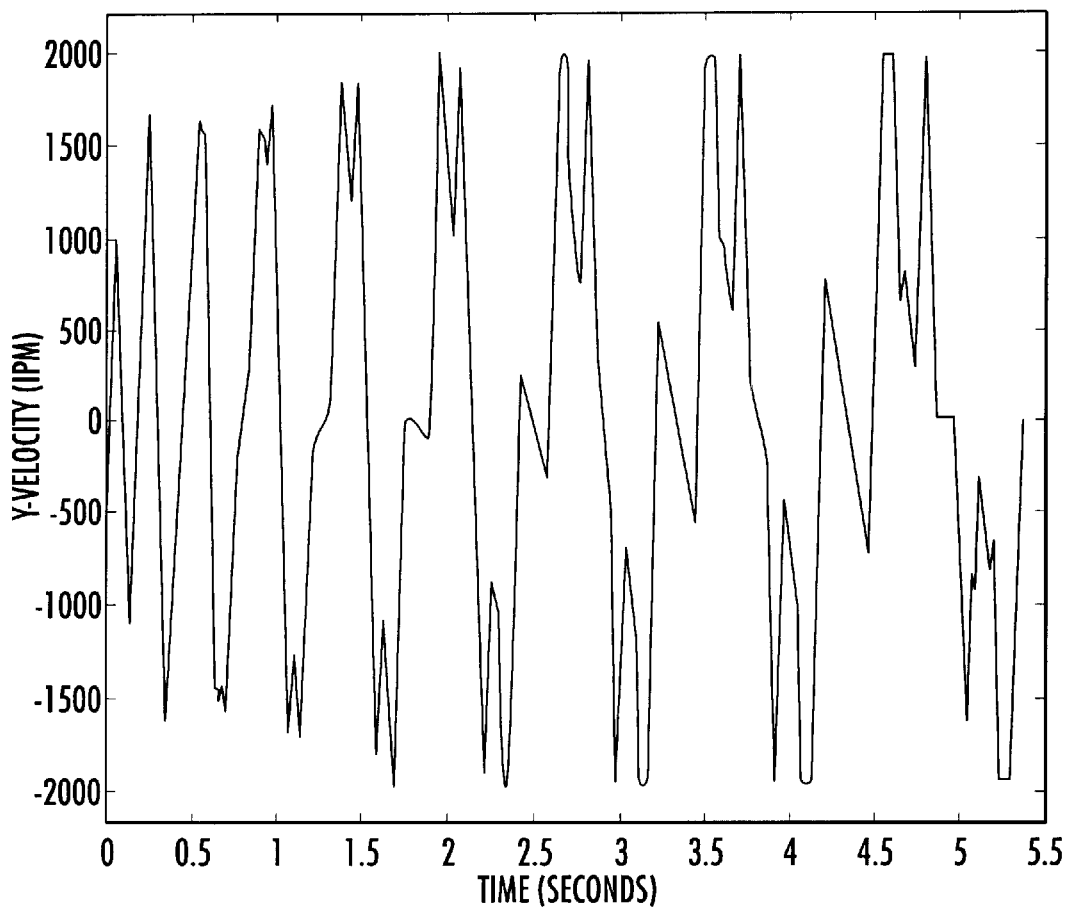
FIG. 20 illustrates y velocity components for the cutting tool moving along the final tool path, in accordance with the first embodiment.
Figure 21:
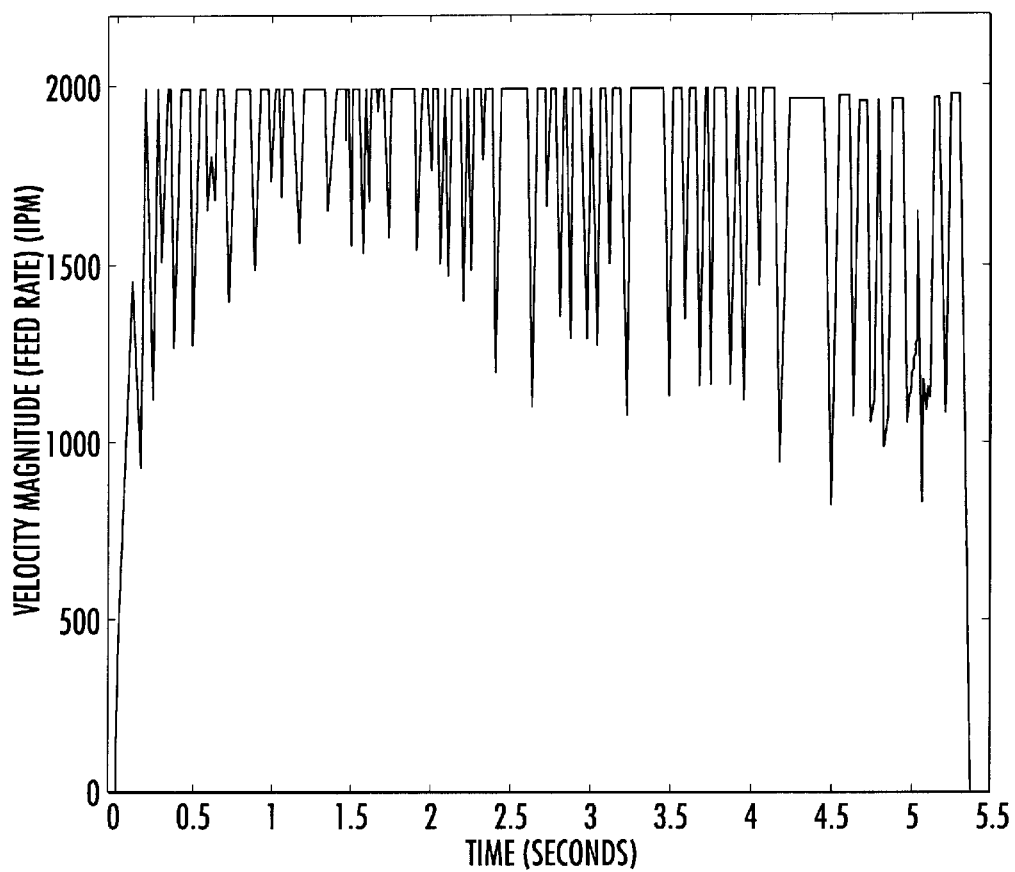
FIG. 21 illustrates velocity magnitude, or feed rate, of the cutting tool along the final tool path, in accordance with the first embodiment.

In accordance with the first embodiment, the machining time for the final tool path 54 is about 5.37 seconds. FIGS. 19 and 20 respectively illustrate the x and y velocity components in in/min (ipm) versus time in seconds, for the cutting tool traveling along the final tool path 54, in accordance with the first embodiment. Unless indicated otherwise, these units are used throughout this Detailed Description section of this disclosure. FIG. 21 illustrates the velocity magnitude, or feed rate, of the cutting tool along the final tool path 54, in accordance with the first embodiment. FIGS. 19–21 illustrate that the velocity components stay within their 2000 ipm limits for the first embodiment. The maximum feed rate occurs on straighter longer path segments and the smaller values seen at times throughout the final tool path 54 are slowdowns due to higher local path curvature.

Figure 22:
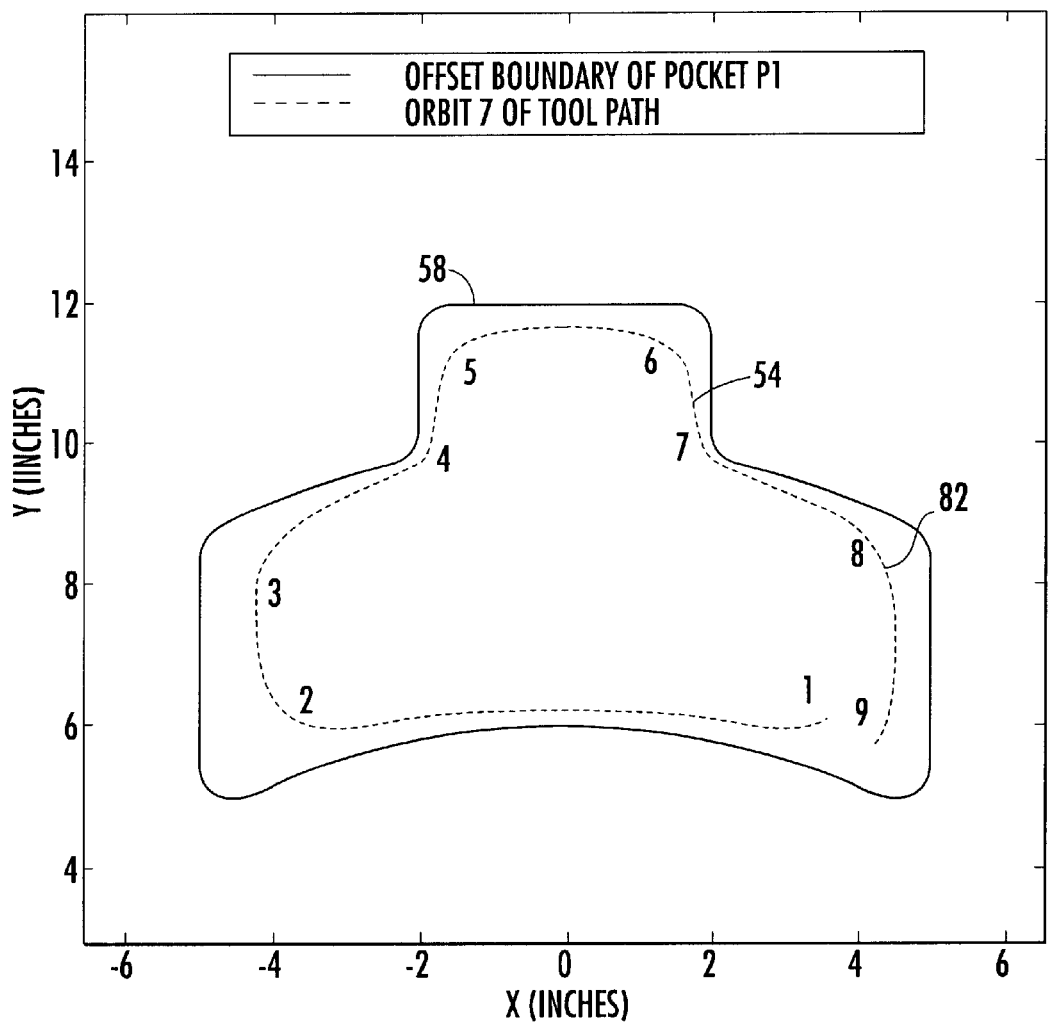
FIG. 22 illustrates a seventh orbit of the final tool path, in accordance with the first embodiment.
Figure 23:
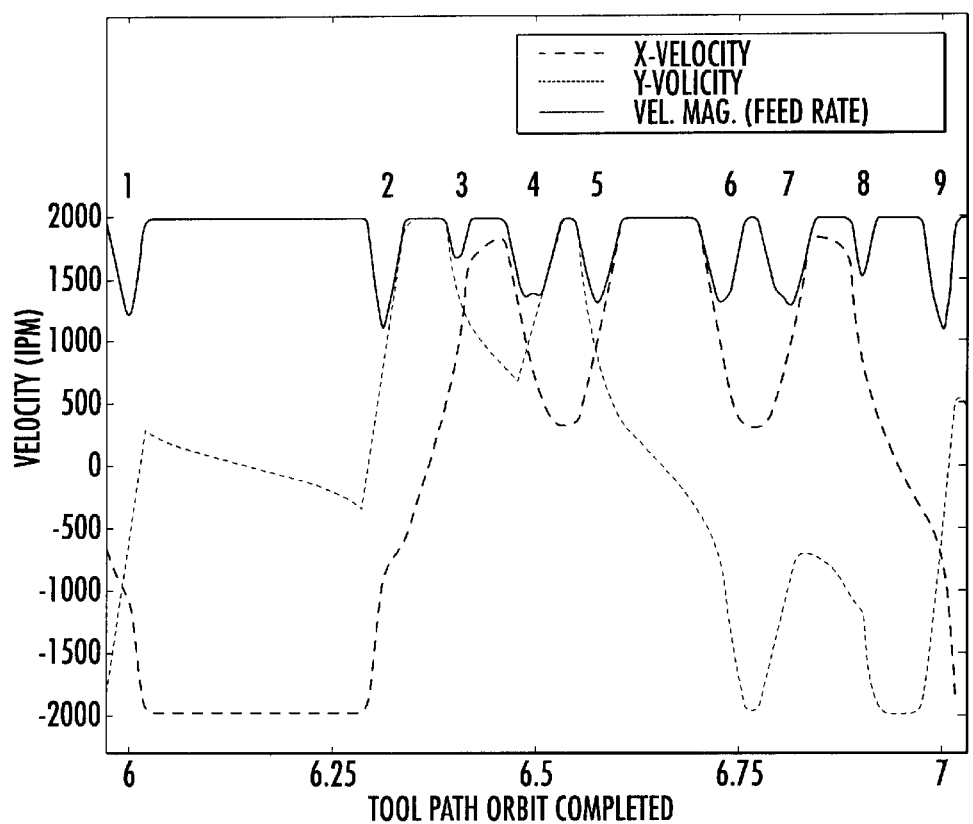
FIG. 23 illustrates velocity components and feed rate for the cutting tool versus location within the seventh orbit of the final tool path, in accordance with the first embodiment.

FIG. 22 illustrates the seventh orbit 82 of the final tool path 54 for the first embodiment. The nine numbers proximate the seventh orbit 82 in FIG. 22 indicate points where the final tool path 54 has relatively local high curvature. Those nine numbers in FIG. 22 correspond to the nine numbered locations in FIG. 23, which illustrates the velocity components and feed rate for the cutting tool versus location within the seventh orbit 82 of the final tool path 54. It is apparent from FIGS. 22 and 23 where the velocity components reach their limit and how the feed rate is lowered because of local path curvature.

Figure 24:
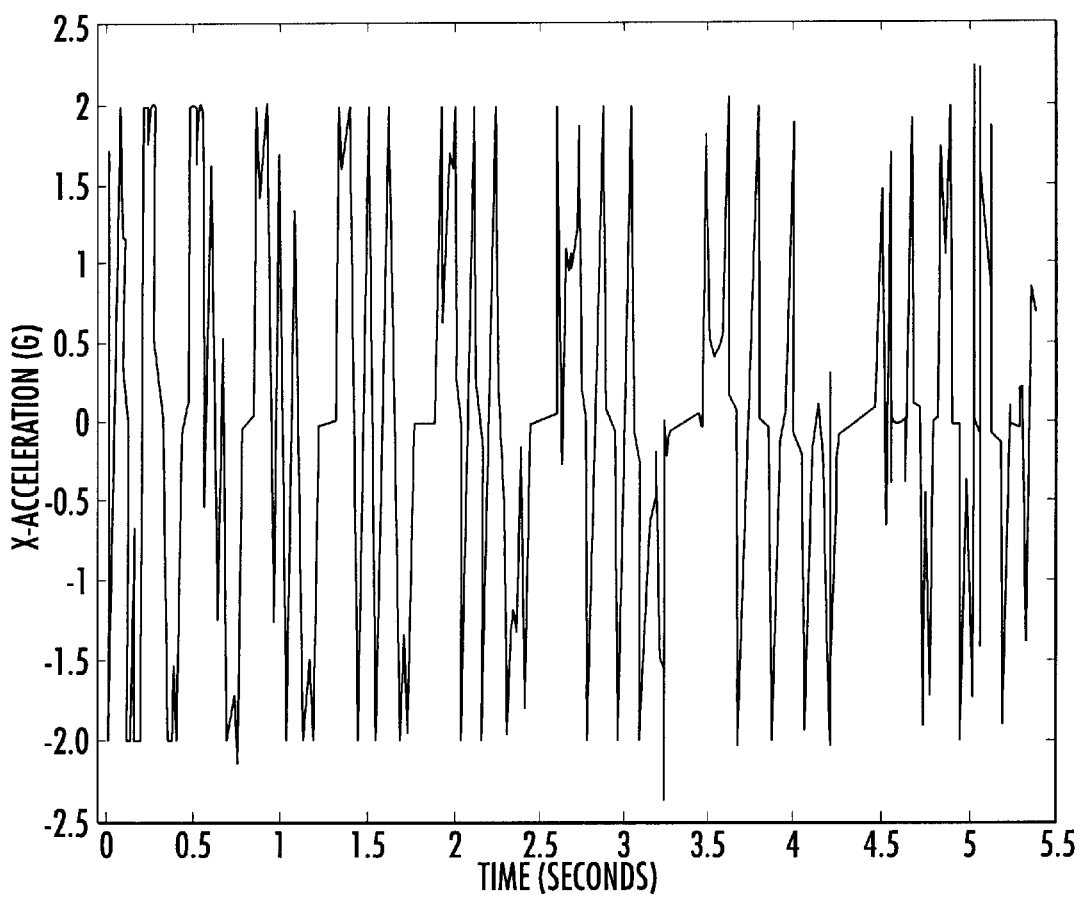
FIG. 24 illustrates x acceleration components for the cutting tool moving along the final tool path, in accordance with the first embodiment.
Figure 25:
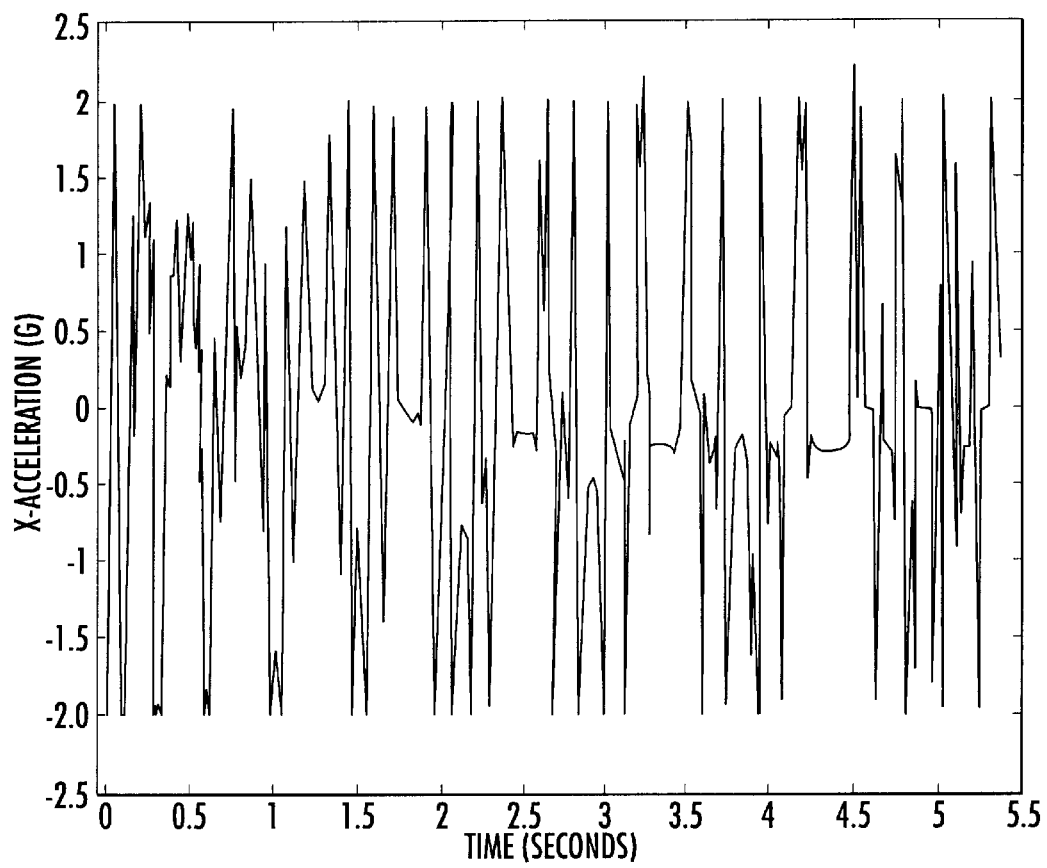
FIG. 25 illustrates y acceleration components for the cutting tool moving along the final tool path, in accordance with the first embodiment.

FIGS. 24 and 25 show the resulting x and y component accelerations, respectively, versus time in seconds for the cutting tool as it travels along the final tool path 54, in accordance with the first embodiment. Acceleration units are in G ($\approx$32.2 ft/sec$^2$) for FIGS. 24 and 25 and all similar subsequent plots. With a few minor exceptions, the component accelerations stay within their given 2G-limit for the first embodiment.

Figure 26:
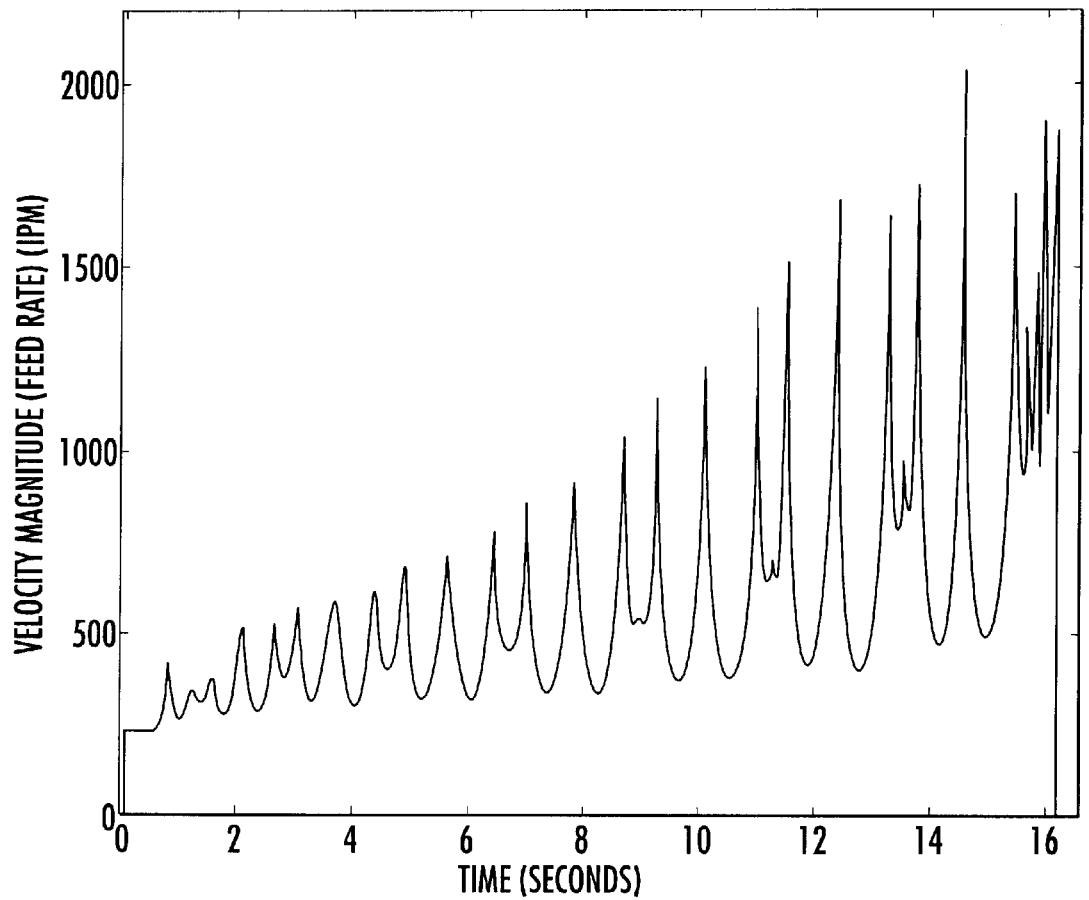
FIG. 26 illustrates velocity magnitude, or feed rate, of the cutting tool along the final tool path, in accordance with a third embodiment.
Figure 27:
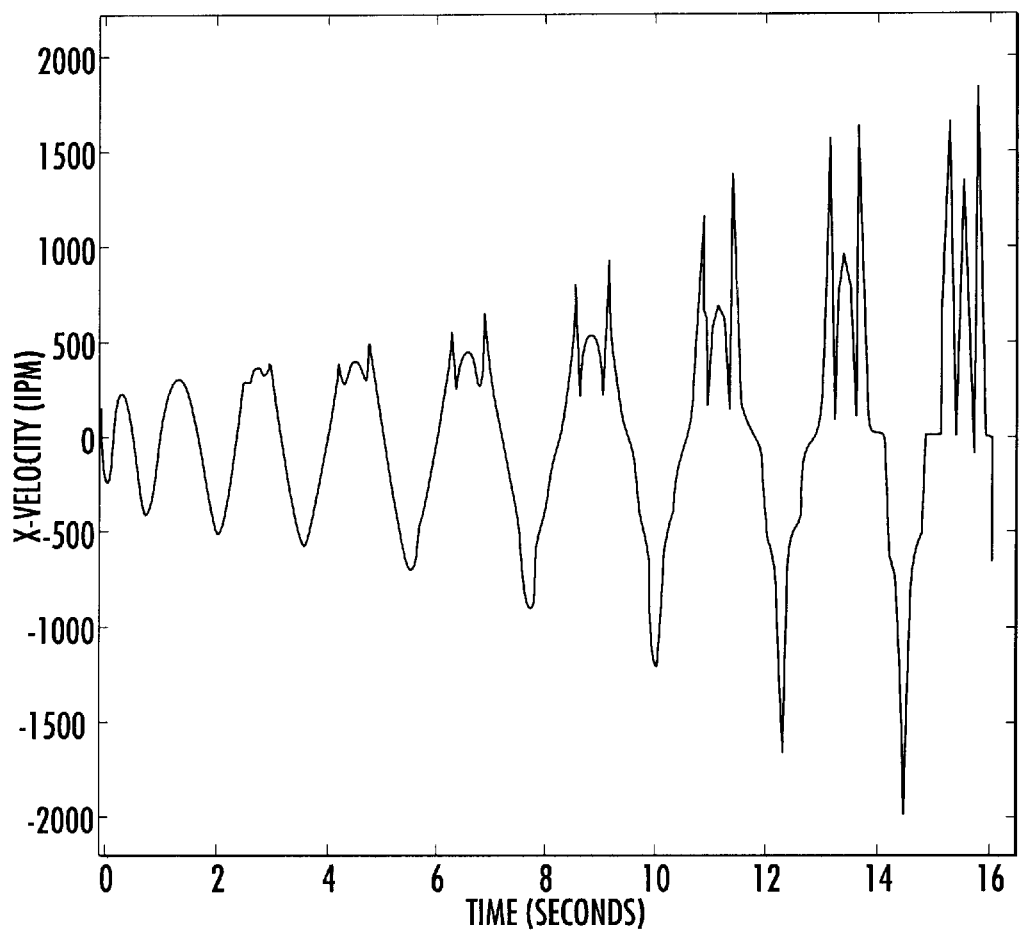
FIG. 27 illustrates x velocity components for the cutting tool moving along the final tool path, in accordance with the third embodiment.
Figure 28:
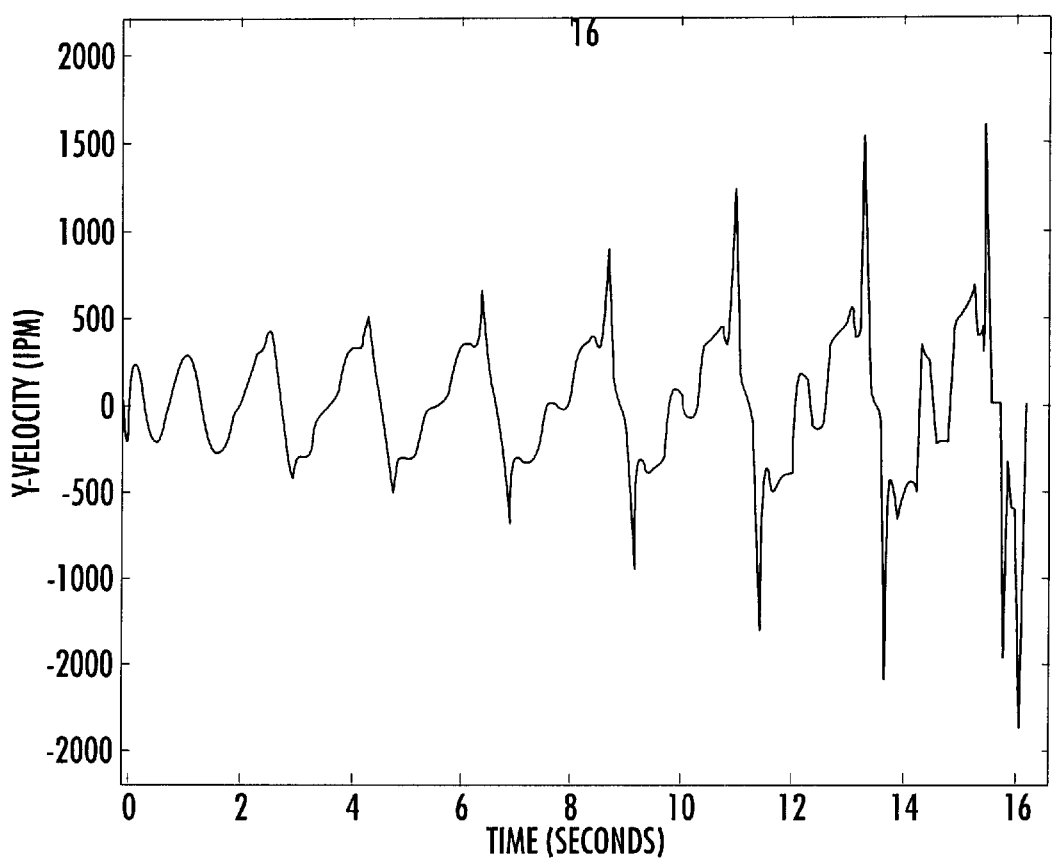
FIG. 28 illustrates y velocity components for the cutting tool moving along the final tool path, in accordance with the third embodiment.
Figure 29:
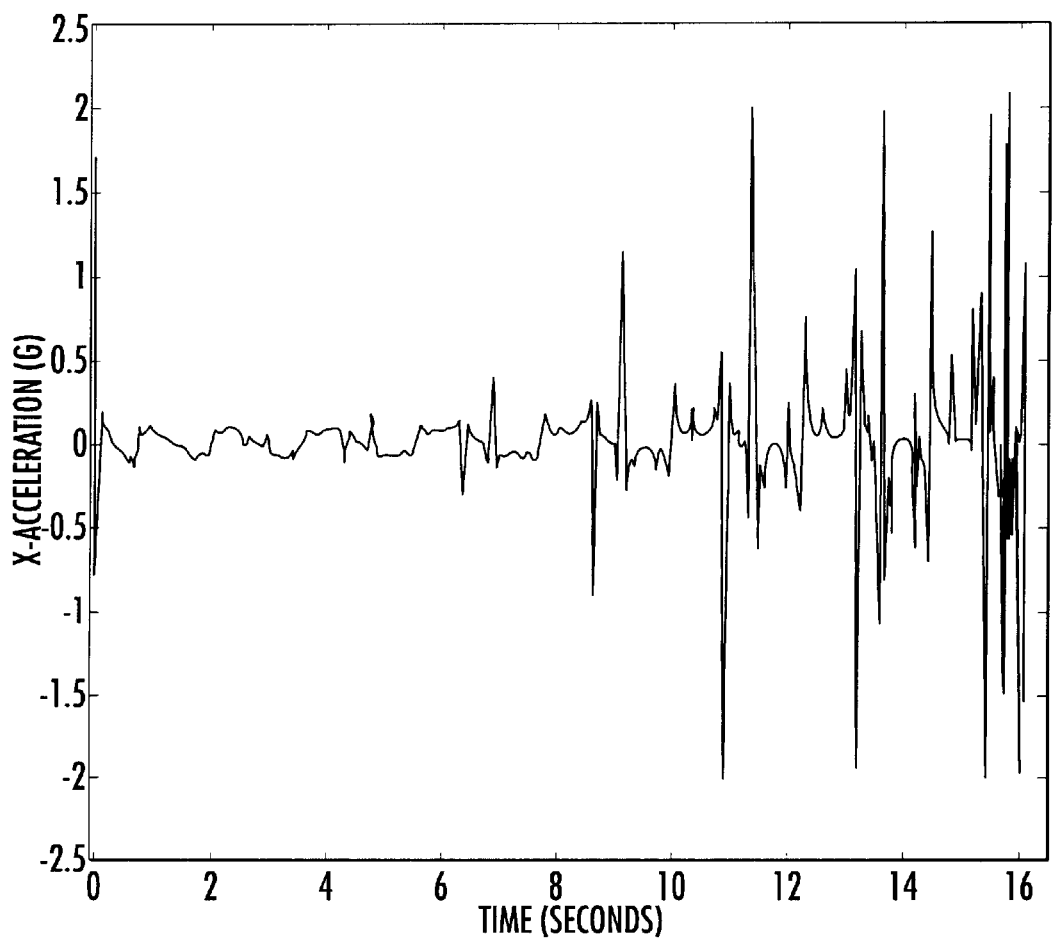
FIG. 29 illustrates x acceleration components for the cutting tool moving along the final tool path, in accordance with the third embodiment.
Figure 30:
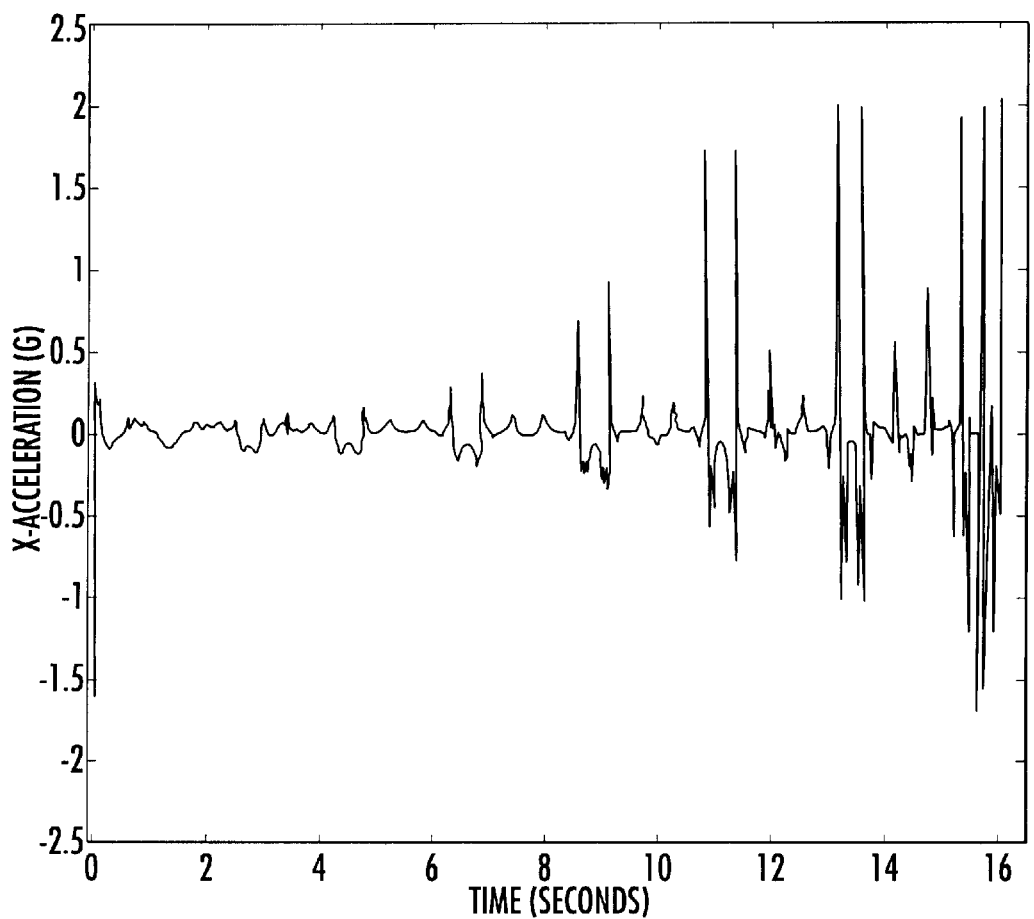
FIG. 30 illustrates y acceleration components for the cutting tool moving along the final tool path, in accordance with the third embodiment.

A third embodiment of the present invention is identical to the first embodiment, except that in accordance with the third embodiment adoc=0.75 inches. The total machining time for the third embodiment is about 16.1 seconds. FIG. 26 illustrates the velocity magnitude (feed rate) versus time, FIGS. 27–28 illustrate the velocity components versus time, and FIGS. 29–30 illustrate the acceleration components versus time, all for the third embodiment. In accordance with the third embodiment, the horsepower constraint (i.e., material removal rate constraint) dictates the trajectory over most of the final tool path 54. In the final couple of orbits of the third embodiment, the acceleration constraints play a more significant role as the path approaches the regions of higher offset pocket boundary curvature and the rdoc becomes smaller in many places.

Figure 31:
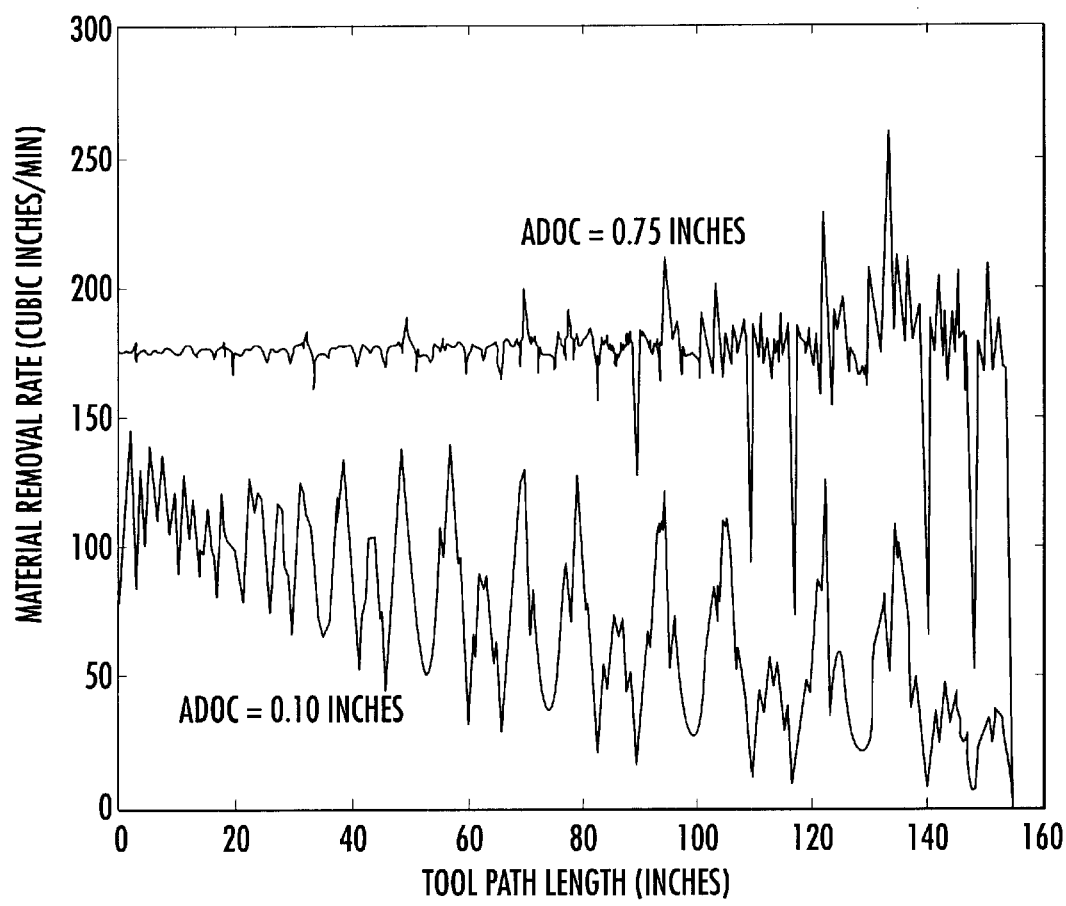
FIG. 31 illustrates material removal rate versus length along the final path for the first and third embodiments.

In accordance with the third embodiment, it takes the cutting tool almost exactly three times longer to travel along the final tool path 54 than it takes for the first embodiment, but the cutting tool of the third embodiment removes 7.5 times more material than the first embodiment, making it better than the first embodiment by at least one measure. FIG. 31 illustrates material removal rate versus length along the final path 54 for the first and third embodiments. The shallow-cut-trajectory of the first embodiment oscillates more as it challenges the governing machine slide constraints. The deeper-cut-trajectory of the third embodiment cannot challenge the machine slide limits since it is running at almost constant maximum horsepower along the majority of the path.

Figure 32:
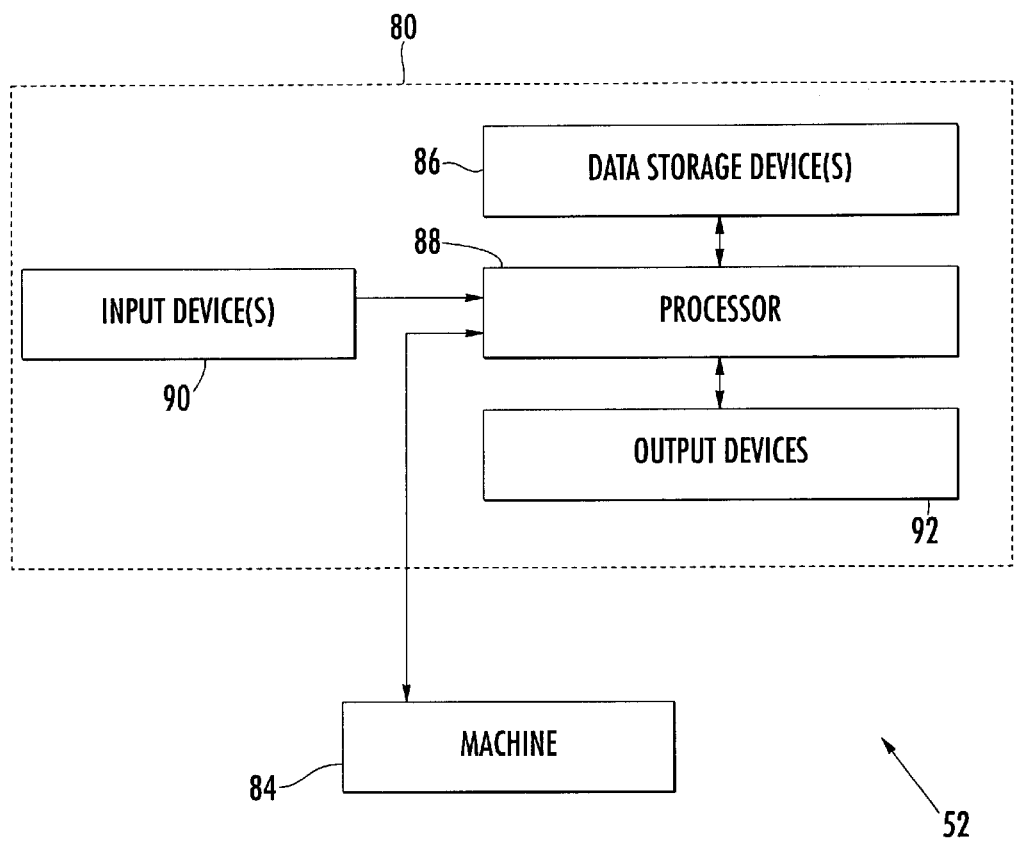
FIG. 32 schematically illustrates a CNC manufacturing machine that is capable of being programmed to form a pocket, in accordance with the first, second and third embodiments of the present invention.

In accordance with the first, second and third embodiments, the cutting tool is preferably manipulated by a CNC manufacturing machine. An acceptable example of a CNC manufacturing machine that is capable of being programmed to perform the operation described above is available from Giddings and Lewis Machine Tools located in Fon du Lac, Wis., as item Nbh110, with a Siemens 840D machine controller. In addition, a suitable CNC manufacturing machine 52 is schematically illustrated in FIG. 32 and described below, in accordance with the first, second and third embodiments. The CNC manufacturing machine 52 includes a machine 84 that includes a tool holder such as a spindle (for example see the spindle 40 of FIG. 1) that carries the cutting tool (for example see the milling tool 42 of FIG. 1), and a computer controller 80 that is interfaced with the machine.

The computer controller 80 includes one or more data storage devices 86, a processor 88, one or more input devices 90, and one or more output devices 92 that are connected and are capable of operating together in a conventional manner that is understood by those of ordinary skill in the art. The data storage device(s) 86 include computer-readable storage medium and can acceptably be in the form of hard disks and drives therefor, floppy disks and drives therefor, CD ROMs and drives therefor, digital video disks and drives therefor, memory cards, or any other type of computer-readable storage medium. The processor 88 is preferably a conventional computer processor, but can be any processing device known to those skilled in the art. The input device(s) 90 preferably include one or more conventional components such as, but not limited to, a keyboard, a mouse, a virtual track ball, a light pen, voice recognition equipment, or the like. The output device(s) 92 preferably include one or more conventional components such as, but not limited to, a display that presents images on a screen, a printer, or the like.

In accordance with the above-described embodiments of the present invention, a software module operates in conjunction with the computer controller 80 to facilitate the above-described operations, and a computer program product includes a computer-readable storage medium (for example see the data storage devices 86 diagrammatically illustrated in FIG. 32) that includes the software module. Those skilled in the art will appreciate that there are many different conventional programming languages that are available and that can be readily used to create the software module of the present invention. The software module can be characterized as computer-readable program code means having a series of computer instructions that are embodied in the computer-readable storage medium for facilitating the operations of the present invention. In this regard, FIGS. 7 and 10 can be characterized as block diagram, flow chart and control flow illustrations of methods, systems and program products according to the invention that can be implemented by the software module. It will be understood that each block or step of the block diagram, flow chart and control flow illustrations, and combinations of blocks in the block diagram, flow chart and control flow illustrations, can be implemented by computer program instructions.

More specifically, in accordance with the above-described embodiments of the present invention, all of the operations described above, except for any carried out by a user of the present invention, are preferably implemented by computer program instructions. These computer program instructions may be loaded onto a computer or other programmable apparatus to produce a machine, such that the instructions which execute on the computer or other programmable apparatus create means for implementing the functions specified in the block diagram, flow chart or control flow block(s) or step(s). These computer program instructions may also be stored in a computer-readable memory that can direct a computer or other programmable apparatus to function in a particular manner, such that the instructions stored in the computer-readable memory produce an article of manufacture including instruction means which implement the functions specified in the block diagram, flow chart or control flow block(s) or step(s). The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions specified in the block diagram, flow chart or control flow block(s) or step(s).

Accordingly, blocks or steps of the block diagram, flow chart or control flow illustrations support combinations of means for performing the specified functions, combinations of steps for performing the specified functions and program instruction means for performing the specified functions. It will also be understood that each block or step of the block diagram, flow chart or control flow illustrations, and combinations of blocks or steps in the block diagram, flow chart or control flow illustrations, can be implemented by special purpose hardware-based computer systems which perform the specified functions or steps, or combinations of special purpose hardware and computer instructions.

The present invention advantageously provides low-curvature tool paths, such as spiral tool paths, that allow for the implementation of high feed rates with low acceleration, as compared to the conventional designs. In addition, cutting tools that travel along the tool paths defined by the methods, apparatus and computer-readable medium of the present invention have low wear rates, as compared to conventional designs.

Whereas the first, second and third embodiments of the present invention have been described in the context of forming pockets having pocket boundaries, in accordance with other embodiments of the present invention a complete layer or complete layers of material are removed so that a pocket does not result. In these embodiments, the invention can be described in the context of removing material from a region having a boundary that extends around an offset boundary. In accordance with one example, the boundary that extends around the offset boundary is proximate and extends around the periphery of the region occupied by the material to be removed. More specifically, a fourth embodiment of the present invention is identical to the first embodiment, except for variations noted and variations that will be apparent to those or ordinary skill in the art. In accordance with the fourth embodiment, a raised region from which material is removed is the region bounded by an outer boundary that is generally identical to the pocket boundary 56 illustrated in FIG. 6, and that outer boundary extends around an offset boundary that is generally identical to the offset pocket boundary 58 illustrated in FIG. 6.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method for defining a path that a cutting tool is capable of traveling along to remove a region of material having an outer boundary, the method comprising:

determining a plurality of nested contours that are internal to the outer boundary; and spiraling between the contours to at least partially form the path, wherein the spiraling comprises forming a first spiral that extends from proximate a first one of the contours to proximate a second one of the contours, and wherein the forming comprises calculating curvature of the first spiral as a function of both of the first and second contours.

2. A method according to claim 1, wherein the spiraling further comprises forming the first spiral so that the distance from the first contour continually increases and the distance to the second contour continually decreases while traveling along the first spiral from proximate the first contour to proximate the second contour.

3. A method according to claim 1, wherein the spiraling further comprises forming the first spiral so that as a ray originating from proximate the center of the area bounded by the outer boundary pivots about the center to travel in a first direction along the entire orbit, for a section of the ray extending between the first and second contours:

the percentage of the section that extends between the orbit and the first contour continually decreases, and the percentage of the section that extends between the orbit and the second contour continually increases.

4. A method according to claim 1, wherein the determining the contours comprises iteratively determining the contours.

5. A method for defining a path that a cutting tool is capable of traveling along to remove a region of material having an outer boundary, the method comprising:

determining an offset boundary that the outer boundary extends around;

determining a plurality of nested contours that are internal to the outer boundary, wherein the determining the plurality of nested contours comprises:

determining a mathematical function that at least approximates the solution of an elliptic partial differential equation boundary value problem defined on the region enclosed by the offset boundary, and determining from the mathematical function the plurality of nested contours; and spiraling between the contours to at least partially form the path.

6. A method according to claim 5, wherein the boundary value problem is a positive definite elliptic partial differential equation eigenvalue problem and the determined mathematical function at least approximates the principal eigenfunction for the positive definite elliptic partial differential equation eigenvalue problem.

7. A method for defining a path that a cutting tool is capable of traveling along, the method comprising:

determining a boundary that extends around and encloses a region;

determining a mathematical function that at least approximates a solution of an elliptic partial differential equation boundary value problem defined on the region enclosed by the boundary;

determining from the mathematical function a plurality of nested contours; and moving between the contours to at least partially form the path.

8. A method according to claim 7, wherein the boundary value problem is a positive definite elliptic partial differential equation eigenvalue problem and the determined mathematical function at least approximates the principal eigenfunction for the positive definite elliptic partial differential equation eigenvalue problem.

9. A machine capable of moving a cutting tool to remove a region of material having an outer boundary, the machine comprising:

a tool holder capable of holding the cutting tool; and a controller operative for moving the tool holder along a path while the tool holder holds the cutting tool, wherein the controller comprises a computer-readable medium on which is stored a program module for defining the path, the program module comprising instructions which, when executed by the controller, perform operations comprising:

determining a plurality of nested contours that are internal to the outer boundary; and spiraling between the contours to at least partially form the path, wherein the spiraling comprises forming a first spiral that extends from proximate a first one of the contours to proximate a second one of the contours, and wherein the forming comprises calculating curvature of the first spiral as a function of both of the first and second contours.

10. A machine according to claim 9, wherein the spiraling further comprises forming the first spiral so that as a ray originating from the center of the area bounded by the outer boundary pivots relative to the center to travel in a first direction along the entire orbit, for a section of the ray extending between the first and second contours:

the percentage of the section that extends between the orbit and the first contour continually decreases; and the percentage of the section that extends between the orbit and the second contour continually increases.

11. A machine according to claim 9, wherein the spiraling further comprises forming the first spiral so that the distance from the first contour continually increases and the distance to the second contour continually decreases while traveling along the first spiral from proximate the first contour to proximate the second contour.

12. A machine according to claim 9, wherein the determining the contours comprises iteratively determining the contours.

13. A machine capable of moving a cutting tool, the machine comprising:

a tool holder capable of holding the cutting tool; and a controller operative for moving the tool holder along a path while the tool holder holds the cutting tool, wherein the controller comprises a computer-readable medium on which is stored a program module for defining the path, the program module comprising instructions which, when executed by the controller, perform operations comprising:

determining a boundary that extends around and encloses a region, determining a mathematical function that at least approximates a solution of an elliptic partial differential equation boundary value problem defined on the region enclosed by the boundary, and determining from the mathematical function a plurality of nested contours.

14. A machine according to claim 13, wherein the boundary value problem is a positive definite elliptic partial differential equation eigenvalue problem and the determined mathematical function at least approximates the principal eigenfunction for the positive definite elliptic partial differential equation eigenvalue problem.

15. A computer-readable medium on which is stored a program module for defining a path that a cutting tool is capable of traveling along to remove a region of material having an outer boundary, the program module comprising instructions which, when executed by a computer, perform operations comprising:

determining a plurality of nested contours that are internal to the outer boundary; and spiraling between the contours to at least partially form the path, wherein the spiraling comprises forming a first spiral that extends from proximate a first one of the contours to proximate a second one of the contours, and wherein the forming comprises calculating curvature of the first spiral as a function of both of the first and second contours.

16. A computer-readable medium according to claim 15 wherein the spiraling further comprises forming the first spiral so that as a ray originating from proximate the center of the area bounded by the outer boundary pivots about the center to travel in a first direction along the entire orbit, for a section of the ray extending between the first and second contours:

the percentage of the section that extends between the orbit and the first contour continually decreases, and the percentage of the section that extends between the orbit and the second contour continually increases.

17. A computer-readable medium according to claim 15, wherein the spiraling further comprises forming the first spiral so that the distance from the first contour continually increases and the distance to the second contour continually decreases while traveling along the first spiral from proximate the first contour to proximate the second contour.

18. A computer-readable medium according to claim 15, wherein the determining the contours comprises iteratively determining the contours.

19. A computer-readable medium on which is stored a program module for defining a path that a cutting tool is capable of traveling along to remove a region of material having an outer boundary, the program module comprising instructions which, when executed by a computer, perform operations comprising:

determining an offset boundary that the outer boundary extends around;

determining a plurality of nested contours that are internal to the outer boundary, wherein the determining the plurality of nested contours comprises:

determining a mathematical function that at least approximates the solution of an elliptic partial differential equation boundary value problem defined on the region enclosed by the offset boundary, and determining from the mathematical function the plurality of nested contours; and spiraling between the contours to at least partially form the path.

20. A computer-readable medium according to claim 19, wherein the boundary value problem is a positive definite elliptic partial differential equation eigenvalue problem and the determined mathematical function at least approximates the principal eigenfunction for the positive definite elliptic partial differential equation eigenvalue problem.

21. A computer-readable medium on which is stored a program module for defining a path that a cutting tool is capable of traveling along, the program module comprising instructions which, when executed by a computer, perform operations comprising:

determining a boundary that extends around and encloses a region;

determining a mathematical function that at least approximates a solution of an elliptic partial differential equation boundary value problem defined on the region enclosed by the boundary;

determining from the mathematical function a plurality of nested contours; and moving between the contours to at least partially form the path.

22. A computer-readable medium according to claim 21, wherein the boundary value problem is a positive definite elliptic partial differential equation eigenvalue problem and the determined mathematical function at least approximates the principal eigenfunction for the positive definite elliptic partial differential equation eigenvalue problem.

* * * * *

UNITED STATES PATENT AND TRADEMARK OFFICE
CERTIFICATE OF CORRECTION

PATENT NO. : 6,591,158 B1                                                       Page 1 of 1
DATED      : July 8, 2003
INVENTOR(S) : Bieterman et al.

It is certified that error appears in the above-identified patent and that said Letters Patent is hereby corrected as shown below:

Column 5,
Line 35, Equation (4) should appear as follows:
-- $\{(x,y) : |x| \leq L/2, |y| \leq BL/2\}$, --
Lines 26 and 27, Equation (3) should appear as follows:
-- $\max_{(x,y) \in \Omega} \Phi(x,y) = 1$. --

Column 10,
Line 37, Equation "(10)", first occurrence, should read -- (9) --;
Line 47, Equation (12) should appear as follows:
--
$$\dot{v} = a,$$
--

Line 52, Equation (14) should appear as follows:
-- $-V \leq r_s\, v \leq V$, --

Equation (15) should appear as follows:
-- $-A \leq r_{ss} v^2 + r_s a \leq A$, --

Column 11,
Lines 17 and 18, should appear as follows:
2. $(AR)^{1/2}$, where $R = |r_s|^3/|r_s \times r_{ss}|$ is the final tool path's radius of curvature, and --

Signed and Sealed this

Sixth Day of January, 2004

JAMES E. ROGAN
*Director of the United States Patent and Trademark Office*